United States Patent [19]
Blount

[11] Patent Number: 5,301,637
[45] Date of Patent: Apr. 12, 1994

[54] ROTARY-RECIPROCAL COMBUSTION ENGINES

[76] Inventor: David H. Blount, 6728 Del Cerro Blvd., San Diego, Calif. 92120

[21] Appl. No.: 956,269

[22] Filed: Oct. 5, 1992

Related U.S. Application Data

[60] Continuation-in-part of Ser. No. 831,792, Feb. 5, 1992, Pat. No. 5,156,115, which is a division of Ser. No. 560,868, Jul. 31, 1990, Pat. No. 5,152,257.

[51] Int. Cl.[5] .............................. F02B 53/00
[52] U.S. Cl. ............................ 123/45 A; 123/241; 418/68
[58] Field of Search .............. 123/45 R, 45 A, 241; 418/68

[56] References Cited

U.S. PATENT DOCUMENTS

| 908,916 | 1/1909 | Weinat | 418/68 |
| 1,817,663 | 8/1931 | Ashworth | 418/68 |
| 3,667,876 | 6/1972 | Boyd | 123/45 A |

FOREIGN PATENT DOCUMENTS 13677 8/1916 United Kingdom ............ 123/45 A

Primary Examiner—John J. Vrablik

[57] ABSTRACT

This invention relates to an apparatus for producing a rotary motion force by means of an internal combustion engine, rotary-reciprocal type, consisting of a housing, a rotor and a shaft combined with a rotor's guiding system, fuel intake system and an ignition system. This internal combustion engine has many uses which are commonly known but this apparatus may also be used as a compressor, as a pump, as an engine powered by an expanding heating liquid or gas or a combination of the above.

24 Claims, 12 Drawing Sheets

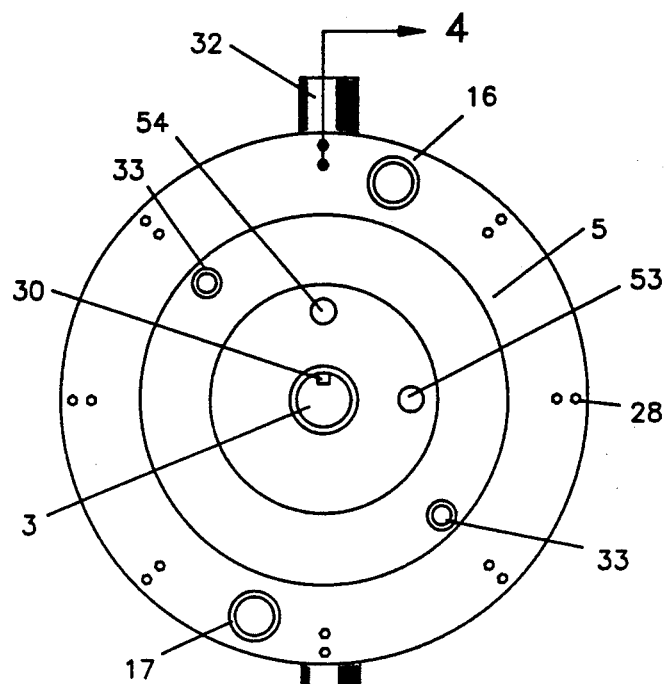
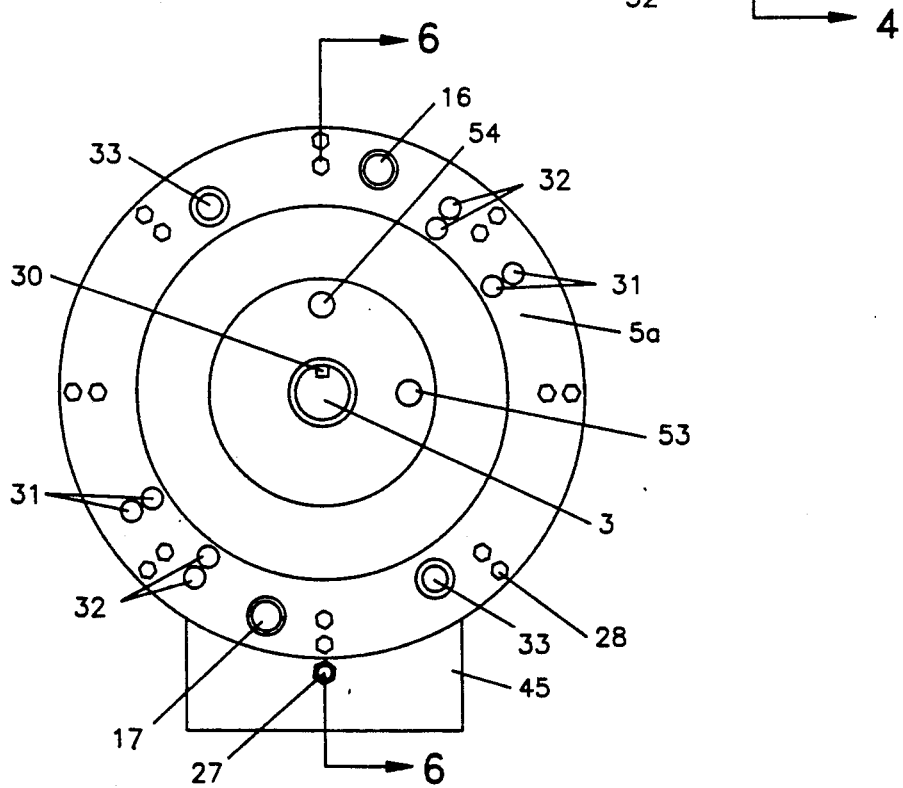

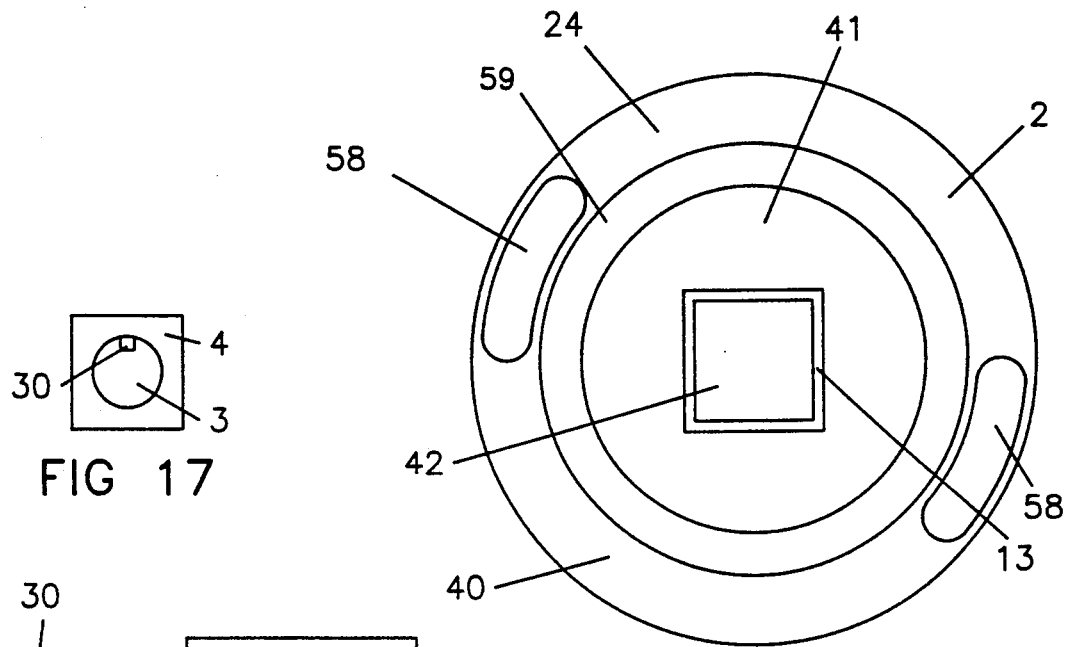
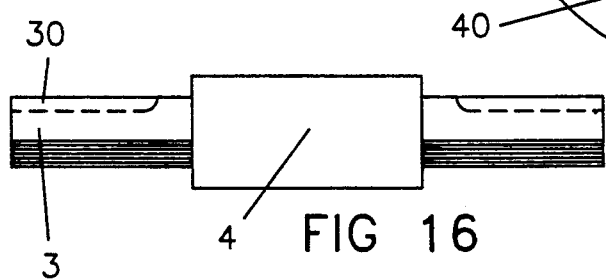
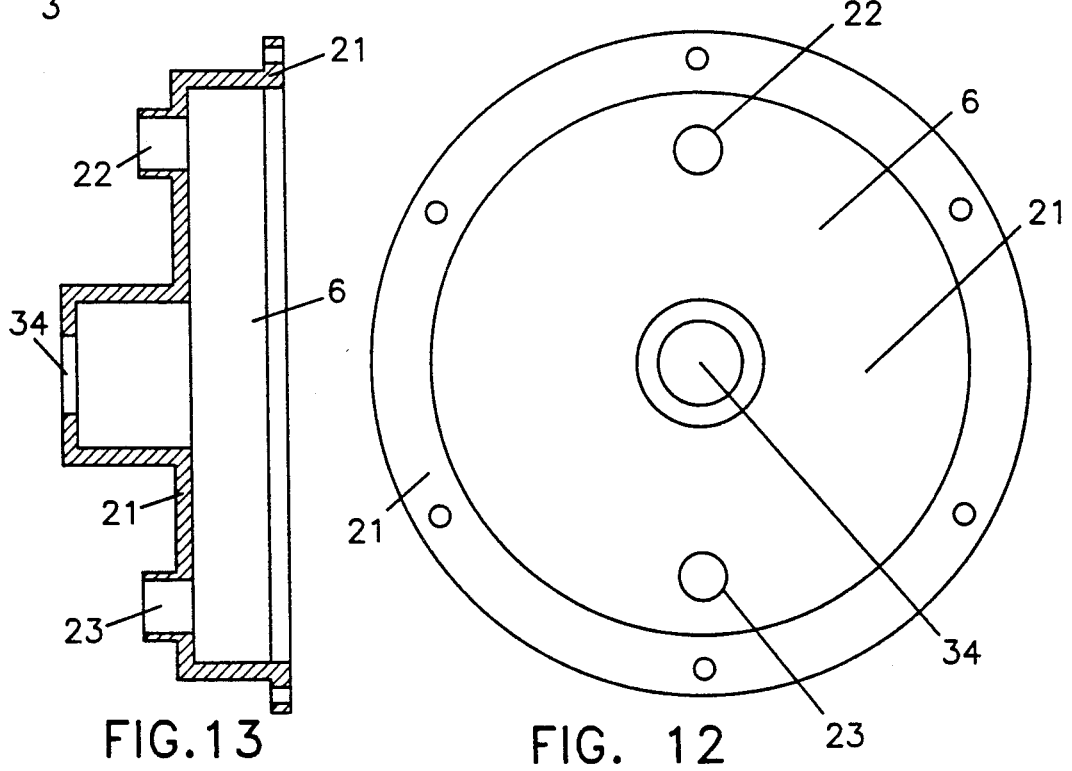

ROTARY-RECIPROCAL COMBUSTION ENGINES

CROSS REFERENCE TO RELATED APPLICATIONS

This application is a continuation in part of my co-pending U.S. application Ser. No. 07/831,792 filed Feb. 5, 1992, U.S. Pat. No. 5,156,115, which is a division of U.S. patent application Ser. No. 07/560,868, filed Jul. 31, 1990 U.S. Pat. No. 5,152,257.

BACKGROUND OF THE INVENTION

The invention relates to an apparatus for producing a rotary motion force by means of an internal combustion engine of the rotary-reciprocal type, provided with a rotor which has a circular shaped piston on the lateral peripheral area of the rotor and which is rotarally and reciprocately mounted on a centrally located engine shaft in a fixed housing having a cavity formed by a circular peripheral wall and two side walls.

Many rotary engines have been invented in the past such as the Agostino Ramelli's water pump, James Watts rotary steam engine, Gilbert's engine, Cooley's engine, Selwood engine, Wankel, Walter engine, Farwell engine, Mercer engine, Porsche rotary engines, Virmel engine, Kauertz engine, Jernals, Geiger engine, Franke engine and others.

Previous known rotary engines came in four main groups:
1. Scissor actions types with pistons or vanes
2. Eccentric-rotor type
3. Eccentric-multi rotor type
4. Revolving-block type The improved engine of this invention is of the novel rotary-reciprocal type wherein the circular rotor reciprocates on the centrally located engine shaft while rotating the engine shaft. The rotary and reciprocal motion is guided by a rotary and reciprocal guide. The engine of this invention is entirely different from the four types of engines listed above.

The present novel rotary-reciprocal apparatus of this invention may be utilized as an internal combustion engine, as a combination of an internal combustion engine and a compressor and/or pump, as a steam engine, as a pump and as a gas compressor, as an engine powered by expanding heated liquids or gases. This engine differs in design from the engines found in U.S. patent application Ser. Nos. 07/831,792 and 07/560,868. This engine has an engine head and the sealing mechanism is different from the above engines.

The basic rotary reciprocal internal combustion engine of this invention consists of stationary cylindrical housing having laterally and peripherally placed cylinder chambers, a central compression chamber and a posterior compression chamber, a circular rotor consisting of a laterally and peripherally placed piston, a side wall (engine head) on the rotor which has a centrally located hub, a centrally located engine shaft consisting of an unround (square, hexagon, triangular, etc.) shape in the center and round ends which protrude out the center of the housing's side walls, a reciprocal and rotary guiding system, an ignition system, a gases mixture intake port and an exhaust port. The housing's chambers are separated by the rotor and closed by means of rings on the rotor. The cylinder chambers vary in sizes when the rotor rotates and reciprocates thereby the strokes of suction, compression, ignition and exhaustion takes place in the cylinder chambers.

The apparatus of this is relatively simple in construction and operation whereby the engine can be produced at relatively low cost. Fewer parts are required in its construction when compared with conventional engines. This new engine design should improve the efficiency of the engine operation and is extremely desirable.

SUMMARY OF THE INVENTION

The object of the present invention is to produce an improved internal combustion engine which is of the rotary-reciprocal type. Another object is to provide a novel apparatus which is a rotary-reciprocal internal combustion engine which also has chambers for compressing a gas and/or pumping fluid. Another object is to produce an apparatus which may be utilized as a two cycle rotary-reciprocal internal combustion engine or as a four cycle rotary-reciprocal internal combustion engine. Another object is to produce an apparatus which has the strokes of suction, compression, ignition and exhaustion. Still another object is to produce multiple arrangement of the rotary-reciprocal internal combustion engine of this invention. Another object is to produce an apparatus which may be utilized as a compressor, as a pump, and as an engine powered by the expansion of heated gases or liquids.

The two cycle and four cycle rotary-reciprocal internal combustion engine of this invention consist of:

1. housing, a stationary hollow cylindrical housing having a circular cavity which is divided into three cavities, a laterally and peripherally placed cylinder chamber which is formed with walls consisting of the inner surface of the peripheral housing wall, the partial inner circular wall which is attached to one side wall (engine head) of the housing and extends parallel with the peripheral wall of the housing toward the center of the housing, leaving room in the housing for the rotor to rotate and reciprocate the inner circular wall also extends outward in the front to form a chamber between it and the peripheral wall below the arcuate recesses and the inner surface of the side wall (front) of the housing, this side wall (engine head) has equally spaced arcuate recesses projecting into the cylinder chamber. The housing has passage ways for admitting a gaseous mixture to the cylinder chamber and passage ways for discharging combustion gases from the cylinder chamber. Compression chambers are formed in the posterior and anterior central area of the housing. These chambers are separated from each other by means of the rotor and closed by rings on the rotor. There are one or more spark plug ports in arcuate recesses of the housing and open into the cylinder chambers.

2. rotor, consisting of laterally and peripheral located circular piston with thick peripheral wall and a hollow center, the piston's side wall (front) has equally spaced waves which match, in shape and number, the arcuate recesses in the cylinder chamber front side wall (engine head) and are at 90° to the peripheral wall of the rotor's piston, also the inner peripheral wall of the rotor's piston extends forward below the piston's waves, rotor's posterior side wall and rotor's hub which is centrally located on the rotor's posterior wall and extends forward parallel with the rotor's peripheral wall and the hub has an unround (square, triangular, hexagon, etc.) opening for the engine shaft. The rotor for two cycle engines has an open passage way from the compression chamber thru the rotor's piston and communicates with the cylinder chamber. The rotor's piston has rings around the peripheral wall and inner circular wall which closes housing chambers. The cylinder chamber is further divided to form two or more cylinder chambers by means of seals which are located on the crest of the waved piston side wall (front) to form chambers for intake, compression, ignition and exhaustion. The rotor is rotarable and reciprocately mounted in the housing on an engine shaft. Counter balance weights may be added to the posterior wall of the rotor especially when only one spark plug is fired thereby giving an uneven pressure on the rotor.

3. engine shaft, consisting of a central unround portion (square, hexagon, triangular, etc.) and two round ends which is mounted in the center of the circular housing cavity, passing thru the hub of the rotor and extending out the side walls of the housing. The engine shaft has means for the rotor to reciprocate on the engine shaft while rotating with the rotor and has means for pulleys, gears, other engines, etc. to attach to the round portion of the engine shaft.

4. rotary-reciprocal guide, consisting of a stationary bearing attached to the housing and a waved rotary-reciprocal guide groove located on the peripheral surface, posterior peripheral surface and/or front peripheral surface of the rotor. The waved side walls of the groove matches, in number and shape, the waved piston's side wall and the arcuate recesses of the cylinder chamber side wall. The rotary-reciprocal guide guides the rotor in the housing while keeping the rotor's rings and seals in continuous contact with the cylinder chamber's walls and varying the volume of the cylinder chamber enabling a compression of a gaseous mixture to take place after admitting a gaseous mixture to the cylinder chamber.

5. ignition system, consisting of means for ignition of compressed gaseous mixture for expansion of cylinder chambers due to pressure on the rotor's piston from the combustion products.

The basic engine components of the engine of this invention may be used in a two cycle or a four cycle engine or in a double two cycle or four cycle engine. The two cycle engine's intake and exhaust ports are located in a position where the expanded combustion gases escape when the cylinder chamber has expanded to it's maximum whereas in a four cycle engine the intake and exhaust ports are located in the area where the cylinder chamber is the smallest so the fuel-air mixture can be drawn in when the cylinder chamber expands and the expanded combustion gases can be pushed out as the cylinder chamber becomes smaller. The two cycle engine may have two cylinder chambers or the cylinder chamber may be divided into two or more chambers by means of adding equally spaced and an equal number of waves to the piston wall and equally spaced, equal shape and equal numbers of arcuate recesses to the housing and adding seals to the crest of each wave on the rotor. Each chamber is furnished with an intake port, exhaust port and ignition means. The four cycle engine requires that the cylinder chamber be divided into two or more chambers wherein one of the chambers is for ignition of compressed fuel-air mixture and the other chamber is for exhaustion of exhaust gases. When the compressed fuel-air mixture is ignited and this one chamber expands by the heated gas pressure the other chamber draws in a fuel-air mixture by its being expanded. In a four cycle engine every other chamber has an ignition system.

A double rotary-reciprocal internal combustion of the two cycle or four cycle type is produced by attaching together the rotor of one engine with the rotor of another engine and mounting the rotors on one engine shaft then mounting the attached rotors into the two engine housing back to back and attaching them together. One rotor is mounted to where the waves of the rotor fits into the arcuate recesses in the housing on one side and on the other side the crest of the waves are mounted where they are opposite to the maximum recessed area of the arcuate recesses of the housing. When a double two cycle engine is to be made two cycle engines are utilized. When a double four cycle engine is to be made two four cycle engines are utilized. The double rotor may be made as a single rotor with double piston areas and only one rotary-reciprocal guiding system. The double rotary-reciprocal engine may be attached to another double rotary-reciprocal engine by attaching the two engine shafts together to form a quadruple rotary-reciprocal engine. Two engines may also be attached together by joining both fronts (engine heads) and shafts together to form a double engine.

The cylinder chamber may be divided into more than two cylinder chambers. More than one of the cylinder chambers may have a spark plug or spark plugs which are fired at the same time. In the two cycle rotary-reciprocal engine each cylinder chamber is furnished with a spark plug and is fired simultaneously. When there is one or two two cylinder chambers in this two cycle engine there is one ignition every 180° of rotation. When there are two cylinder chambers in the four cycle rotary-reciprocal engine there is a spark plug for every other cylinder chamber and there is one ignition every 180° of rotation. When there are 3 cylinder chambers in the two cycle rotary-reciprocal engine there are 3 spark plugs that fire simultaneously and there is an ignition every 120° of rotation. In a 3 cylinder chambers four cycle engine there is one spark plug. The spark plug is fired twice per 360° of rotation and one of the cylinder chambers are utilized to compress the gaseous mixture for the second time. In a 2 cycle, 4 cylinder chambers, rotary-reciprocal engine there is a spark plug for each cylinder chamber and they fire simultaneously every 90° of rotation. In a 4 cycle, 4 cylinder chambers, rotary-reciprocal engine there is a spark plug for every other cylinder and they fire simultaneously every 90° of rotation. In a 6 cylinder chambers, rotary-reciprocal engine there is an ignition every 60° of rotation. Odd numbers of cylinder chambers may be utilized in 2 cycle rotary-reciprocal engines.

The compression ratio and the reciprocal stroke is controlled by the design of the waved sides of the rotor guide which also dictates the design of the arcuate recesses in the cylinder chamber side wall and the rotor's piston waved side wall because the three must have the same pattern in order for the piston seals to continuously engage the inner surface of the cylinder chamber walls (engine head). The compression ratio and the reciprocal stroke may be designed as desired.

A pattern for the design of the waved and arcuate recessed surfaces is made by measuring the circumference of the peripheral surface of the rotor of the desired diameter then measure that distance in a straight line on a pattern. Divide that line into equal parts equal to the amount of cylinder chambers desired, these points are the trough of the wave. Then find the center between each trough and that is the point where the crest of the wave will be then measure from this point out at 90° the amount of desired reciprocal stroke and that point is the crest of the wave where the seals are located. Now draw a curved line connecting the trough points with the crest points thereby producing the pattern for the waves of the rotor's piston and arcuate recesses of the housing.

The combustion chambers are formed by the inner surface of the peripheral housing wall, wave surface on the piston front wall with its seals on the crest of the waves, inner surface of the arcuate recesses of the housing wall and the extended inner circular wall of the rotor's piston. The combustion chambers are sealed by the rings and seals.

The fuel systems for this rotary-reciprocal engine may be selected from a fuel pump-carburetor system, direct injection system or an air-assisted fuel system or any other desirable means. In a 2 cycle rotary-reciprocal engine the gaseous mixture may enter into a compression chamber which communicates with the cylinder chamber or only compressed air enters into the cylinder chambers from the compression chamber and the fuel is directly injected or air-assisted injected into the cylinder chambers. In a 4 cycle engine of this invention the gaseous mixture aspirated from a carburetor into the cylinder chambers or the air may be aspirated in and the fuel directly injected or air-assisted injected into the cylinder chambers utilizing compressed air from the compression chamber. Any suitable fuel may be utilized in the engines of this invention, suitable fuels include but are not limited to organic gases, liquid and powders such as petroleum fuel, e.g. gasoline, other petroleum distillates, organic gases e.g. methane ethane, propane, butane carbide, etc. alcohols, e.g. methanol, ethanol, propanol, etc., hydrogen, coal powder mixed with flammable gases or liquids. Gasoline is the preferred fuel.

The ignition system for this rotary-reciprocal engine may consist of any suitable method to ignite the fuel in the combustion cylinder chambers by means of an electrical spark or heat. The preferred ignition system is that commonly utilized in automobiles consisting of a storage battery, generator or alternator, and a timing device such as a distributor or an electronic timing device which are connected by wires to the spark plugs.

The cooling system of this rotary-reciprocal engine may be cooled by means of a liquid cooling system, by an air cooling system or by a combination of these two systems. In the liquid cooling system the coolant is pumped into chambers around the walls of the cylinder chambers then to a radiator for cooling then back to the engine. Cooling fins may be made into the walls of the cylinder chambers and cooled by air. Air also is utilized from the compression chambers to cool the inside of the rotor's piston and this heated compressed air may be utilized in the gaseous mixture which communicates with the cylinder chambers.

The rotor may have a counter balance weight added to the rotor or attached to the engine shaft. In engines with more than two spark plugs which are opposite to each other the ignition force is counter balanced but when only one spark plug is used as in a 4 cycle, 2 cylinder chamber, engine, a counter balance weight is useful.

DESCRIPTION OF THE DRAWINGS

Other objects of the invention will become apparent upon reading the annexed detail description in connection with the drawing in which:

FIG. 1 is a front view of a 2 cycle, 2 cylinder chamber engine.

FIG. 2 is a front view of a 4 cycle, 4 cylinder chamber engine.

FIG. 12 is a posterior view of a side wall of the housing containing the posterior compression chamber.

FIG. 13 is a sectional view of the posterior compression chambers of the housing.

FIG. 14 is a front view of the rotor of a 2 cycle, 2 cylinder chamber engine.

FIG. 16 is a side view of the engine shaft.

FIG. 17 is a front view of the engine shaft.

DESCRIPTION OF PREFERRED EMBODIMENT

Figure 3:
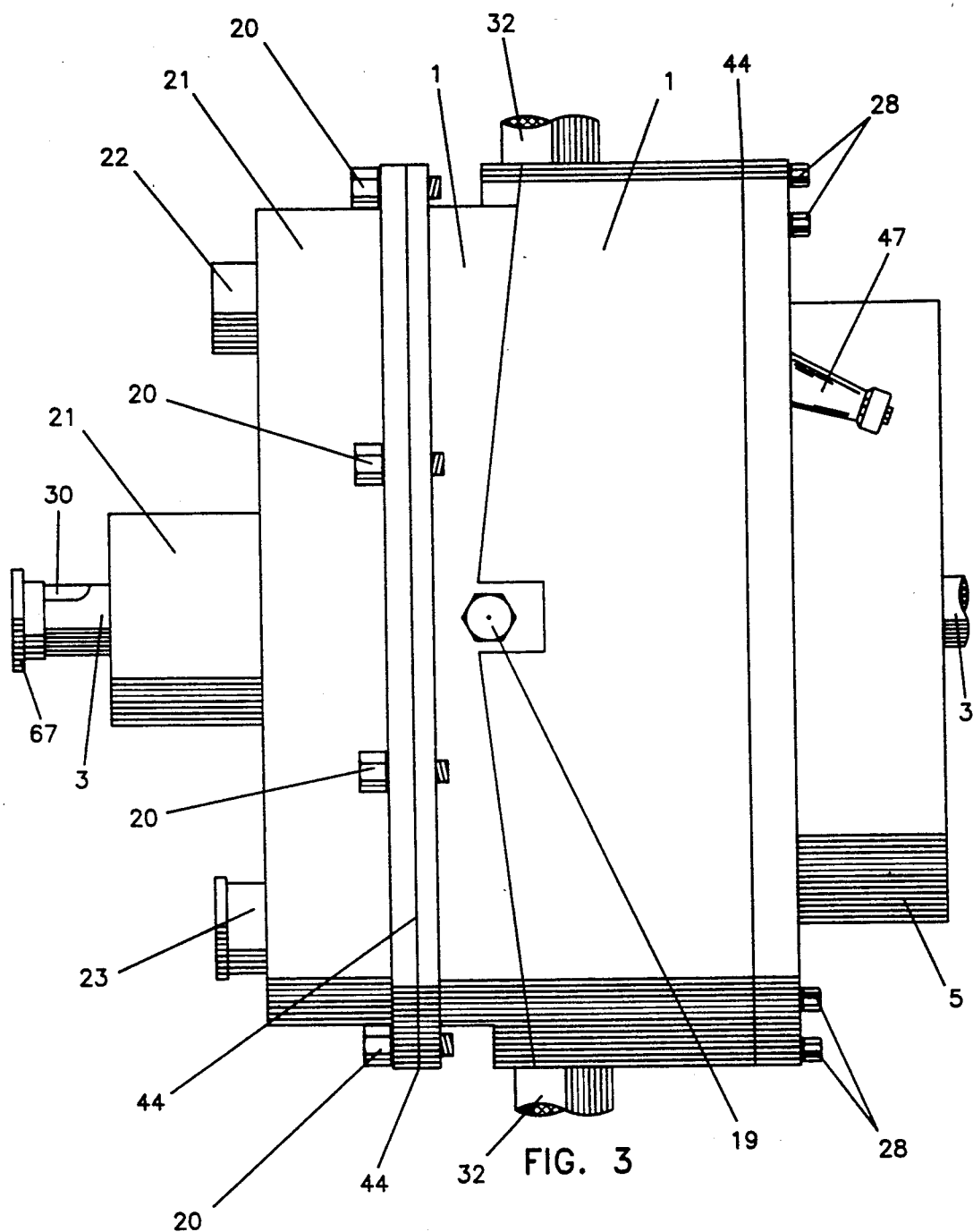
FIG. 3 is a plan view of a 2 cycle, 2 cylinder chamber engine.

Referring to the drawings and in particular to FIG. 1 and FIG. 3 the rotary-reciprocal engine of the present invention includes an engine housing 1 which has an engine head 5 attached to the front of the engine housing by bolts 28, a posterior housing 21 for posterior compression chamber 6 is attached to the posterior of the engine housing by bolts 20. An attachment 19 goes thru the housing and holds the rotary-reciprocal guide bearing in place. The round portion of the engine shaft 3 extends out thru the center of the housing and has a groove 30 for a pin. The engine housing 1 of the two cycle engine has exhaust ports 32 in the peripheral posterior area of the housing. A combustible fuel, oil and air mixture is taken thru an intake port 22 into the posterior compression chamber 6 by suction and the posterior compression has an outlet port 23 when needed.

The engine head 5 has an intake port 16 for a coolant and an outlet port 17 for the coolant which is circulated thru a radiator then back thru inlet port 16 by means of a pump. The housing's cylinder chamber 35 is surrounded by passage way 49 for a liquid coolant. The front of the engine housing has two spark plug ports 33, an intake port 53 to the anterior compression chamber 51 suctioning in an air and/or air-fuel mixture and an outlet port 54.

Figure 4:
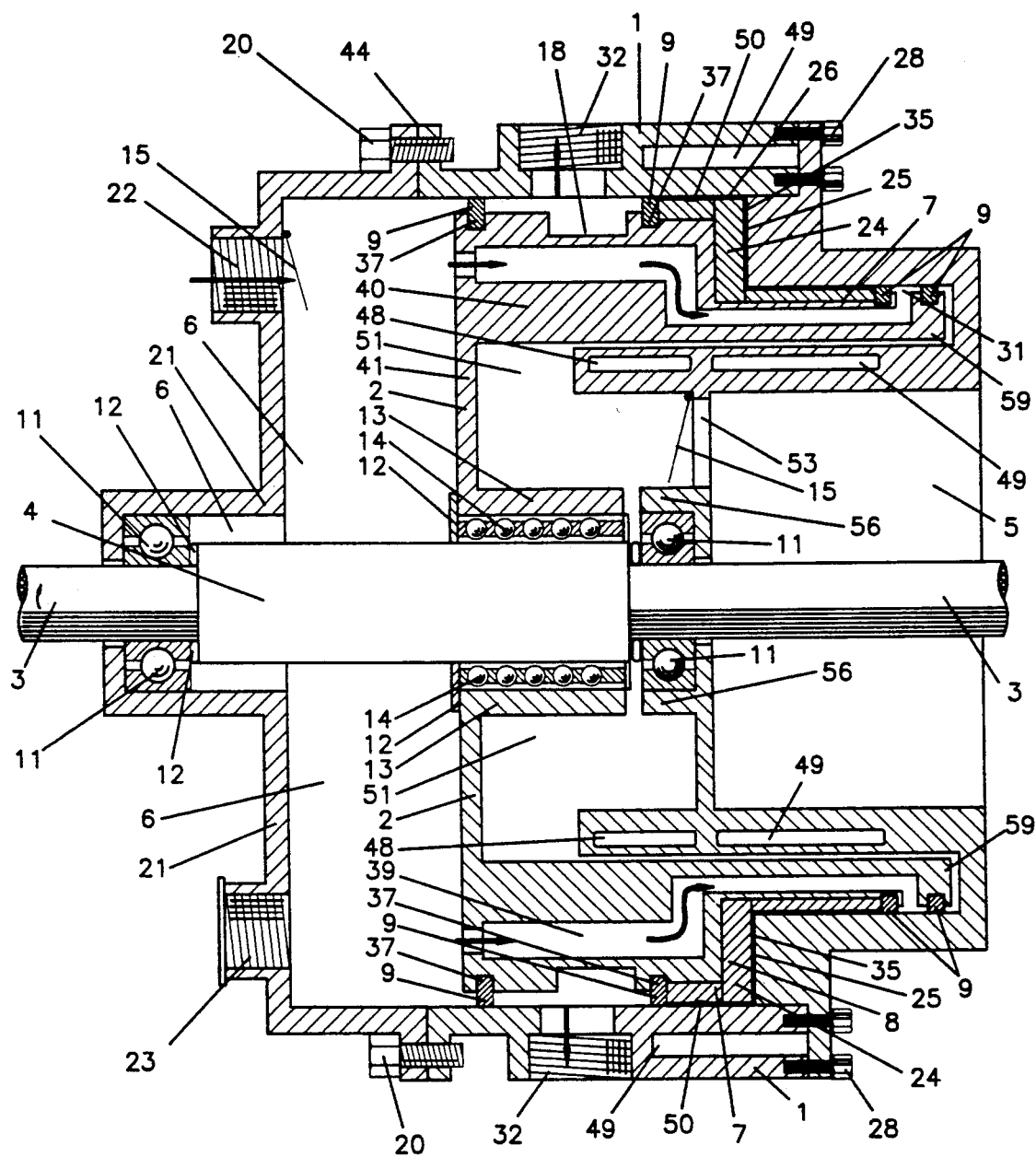
FIG. 4 is a sectional view taken along line 4—4 of FIG. 1, a 2 cycle, 2 chamber engine.

Referring to FIG. 4 a sectional view of a 2 cycle, 2 cylinder chamber, engine consist of a fixed engine housing 1 having a cylindrical cavity which is divided into lateral and peripheral located cylinder chamber 35, an anterior compression chamber 51 which is located in frontal central area and a posterior compression chamber 6. The cylinder chamber 35 is formed by the frontal lateral peripheral wall, the arcuate recessed front side wall 25 of the engine head and the circular inner wall 48.

The rotor 2 is rotorably and reciprocally mounted in the housing cavity on a centrally located engine shaft 4. The rotor 2 is cylindrical shaped with a thick peripheral piston 40 area which has equally spaced waved surface 24 on the front peripheral side wall which are at 90° to the peripheral wall of the rotor and the inner peripheral wall of the rotor's piston extends forward to form the inner peripheral wall of the combustion chamber, with the central area being open in front and the posterior rotor wall 41 which is at 90° to peripheral wall of the piston is closed and has a hub 13 in the central area which protrudes laterally at 90° and which fits over the unround (square) portion of the shaft 4. The rotor 2 reciprocates on the engine shaft 4 by means of a bearing 14 which may be a roller type bearing or a metal oil bearing. The engine shaft 3 is mounted on bearings 11 on the side walls 56, front and posterior, and rotates with the rotor 2. The rotor's piston 40 has rings 9 which close off the cylinder chamber 35 from the central 51 and posterior 6 compression chambers and the rotor's piston 40 fits into the cylinder chamber 35. The rotor 2 has a rotor and reciprocal guide 18 on the peripheral surface of the rotor and its walls are equally spaced waves which are the same shape and number as the waved shape rotor surface 24 and the arcuate recesses 25 in the engine housing's front peripheral wall (engine head). The center of the piston 40 portion of the rotor has a passage way 39 from the posterior compression chamber 6 thru the inner piston wall and communicates with the cylinder chamber 35 when the rotor's piston 40 reciprocates posteriorly and the cylinder chamber 35 is expanded to its maximum and the fuel-gaseous mixture passes into the cylinder chamber 35 while the exhaust gases pass out the exhaust port 32 on the peripheral wall of the engine housing 1. The central front wall has an inlet 53 for air, fluid or fuel-air mixture and has a one way value 15 such as a Reed valve going into the central compression chamber 51 also there is an outlet passage 54 from the central compression chamber and may or may not be opened depending if the chamber is used as a compressor or pump.

Figure 5:
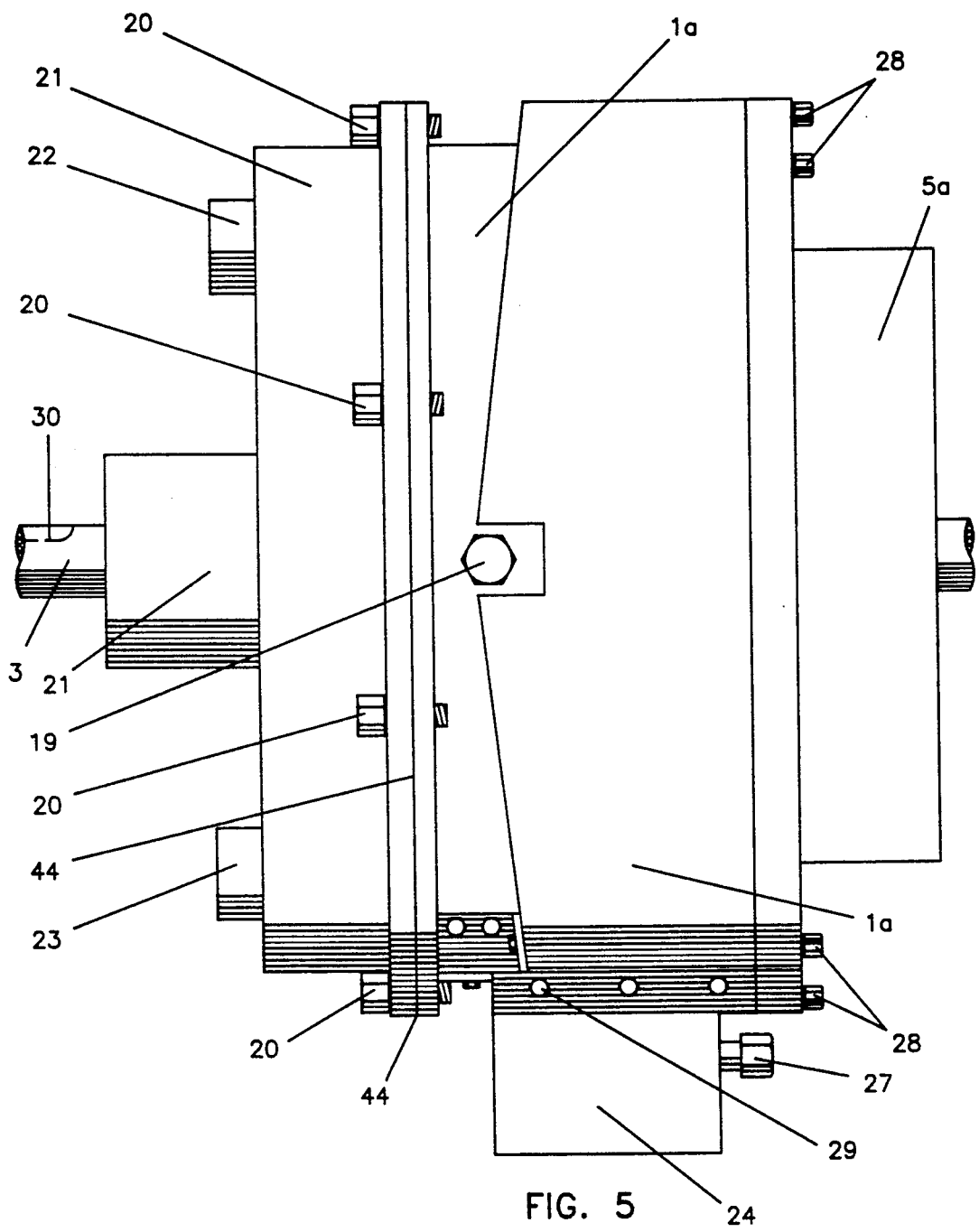
FIG. 5 is a plan view of the housing of a 4 cycle, 4 cylinder chamber engine.
Figure 6:
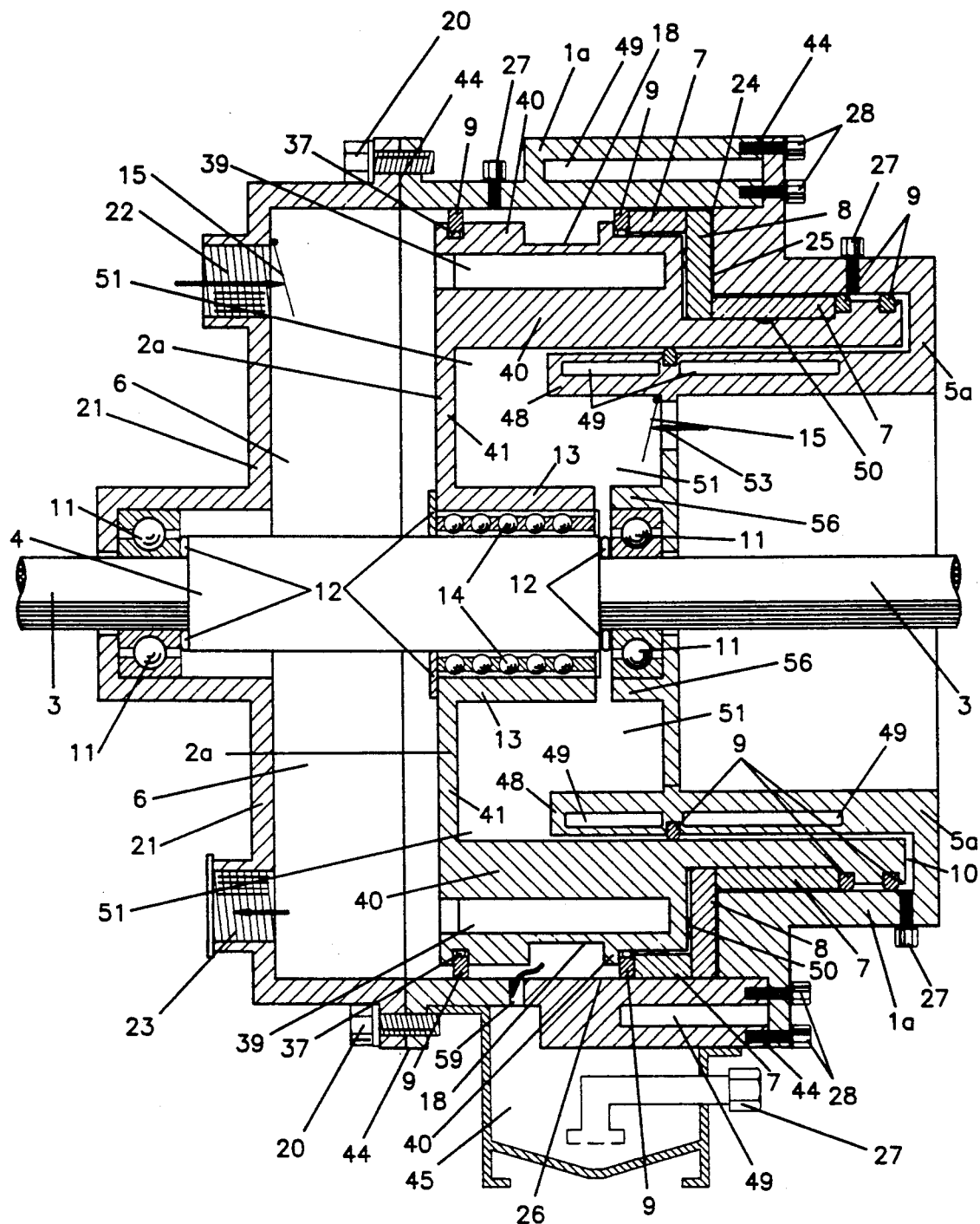
FIG. 6 is a sectional view taken along line 6—6 of FIG. 2, a 4 cycle, 4 chamber engine.
Figure 18:
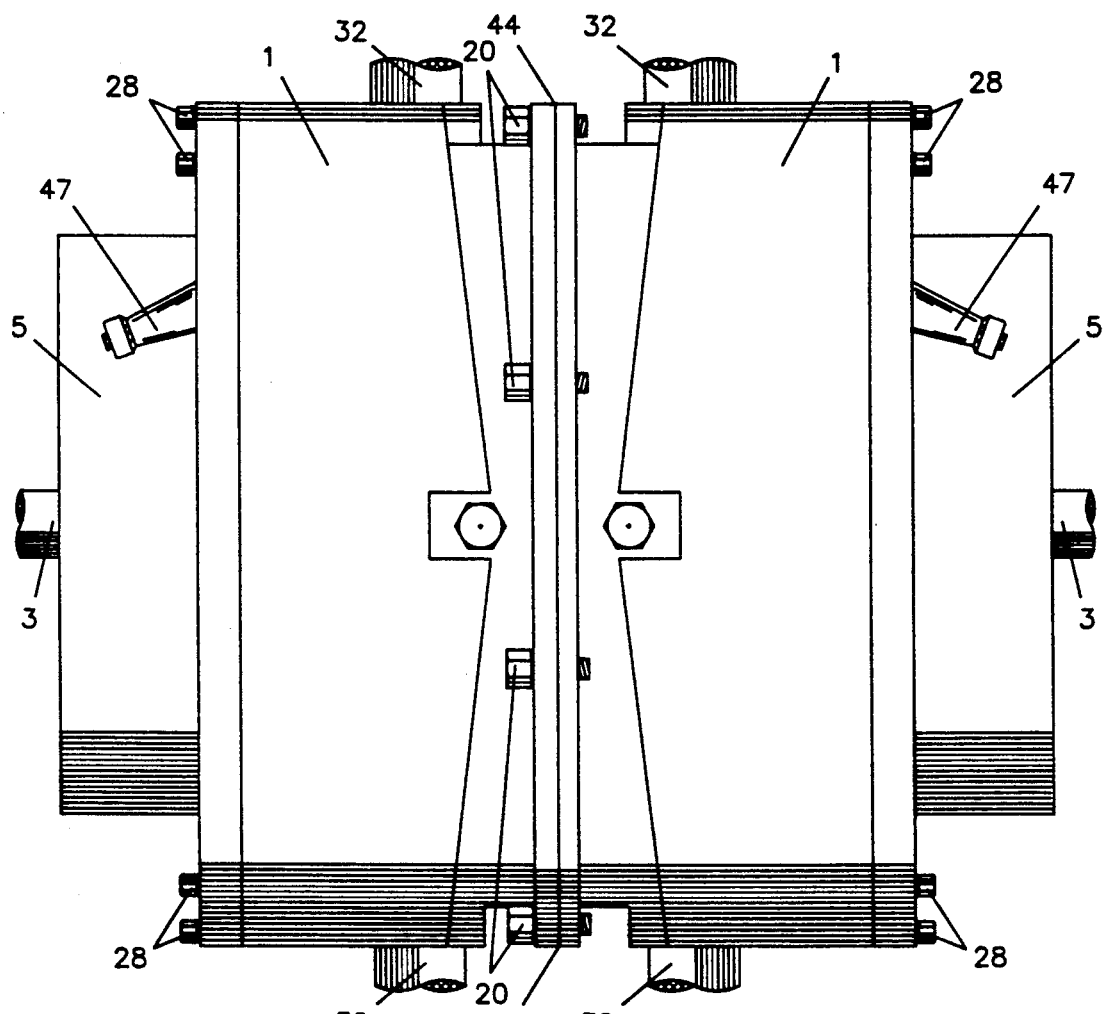
FIG. 18 is a side view of a double 2 cycle engine.

Referring to FIG. 2, 5 and 6 wherein drawings of a 4 cycle, 4 cylinders chamber, engine is drawn shows that the housing 10, rotor 2a and engine shaft 3, 4 are essentially the same as a 4 cycle, 4 cylinder chambers, engine except that the exhaust port is in the front wall (engine head) of 2 of the cylinder chambers and the intake port is also in the front wall of two of the cylinder chambers and there are two spark plug 47. FIG. 2 is a frontal view of a 4 cycle, 4 chambers, engine consisting of a fixed housing 1a, an engine head 5a, engine shaft 3, and an oil pan 45 with an oil outlet 27. The engine head 5 has a coolant inlet 16 and a coolant outlet 17 and is attached to the engine housing 1a by bolts 28. The engine housing 1a has a 1 way inlet 53 and an outlet 54 communicating with the central compression chamber 51. The housing 1a has an exhaust port 32 and an intake port 31 and spark plug port 33 communicating with two cylinder chambers. FIG. 5 is a plan (side) view of a 4 cycle, 4 cylinder chambers, engine consisting of a fixed engine housing 1a with an attachment 19 to hold the rotary-reciprocal guide bearing, spark plug 47 for ignition, oil line 27 for lubricating rotor; a posterior housing 21 for posterior compression chamber 6, which has a 1 way intake port 22 and an outlet port 23 and is attached to the engine by bolts 20; an oil pan 24 with an oil line 27 and is attached to the engine housing by means of bolts 29; and the round portion of the engine shaft 3 extending thru the front and posterior housing. FIG. 6 is a sectional view of FIG. 2, of the 4 cycle, 4 cylinder chambers, rotary-reciprocal engine of this invention consisting of a fixed engine housing 1a which has an engine head 5 attached to it in front by bolts 28 and the water jacket has coolant passages 49 around the cylinder chambers 35 walls, then posteriorly there is a posterior housing 21 which is attached to the engine housing 1a by bolts 20 and at the bottom of the housing is an attached oil pan 45 which is attached by bolts 29. The fixed engine housing 1a has a cylindrical cavity which is divided into a cylinder chamber 35, an anterior central compression chamber 51 and a posterior compression chamber 6. The cylinder chamber 35 is located in the lateral peripheral portion of the housing cavity and is formed by the inner peripheral wall 26, the peripheral portion of the front wall 25 (engine head) which has four equally spaced arcuate recesses 25 at 90° to the peripheral wall and a partial inner wall 59 which extends forward on the housing which is cylindrical in shape attached at 90° to the front arcuate recessed wall 25, and inner peripheral wall 48 extends posteriorly but leaves room for the rotor to rotate and reciprocate and is below the peripheral wall 26 and rotor's piston. It forms the anterior central compression chamber 51 along with the front wall which also has a one way inlet 53 and an outlet 54. An oil line 27 attaches to the inner wall 48 and flows into a portion of the cylinder chamber 10 then is pumped thru a passage way 27, thru the rotor 2a to the peripheral wall 26 then back to the oil pan 45 thru an opening 57 in the exterior, inferior portion of the housing. A cylindrical shaped rotor 2a is rotorably and reciprocally mounded in the housing cavity on a centrally located engine shaft 4 which protrudes thru the housing's front and posterior walls. The rotor 2a has a thick peripheral wall 40 with the front inner portion extending forward into a chamber formed by the forward extention of the inner peripheral wall and the peripheral wall of the housing and the posterior area is closed with a wall 41 which is 90° C. to the rotor's peripheral wall and has a centrally located hub 13 which extends laterally at 90° to the posterior wall and has an unround central passage 42 thru the hub 13, the thick peripheral wall is the piston 40 portion of the rotor 2a and has 4 equally spaced waves 24 on the front wall which are 90° to the peripheral wall 26 of the rotor 2a and are shaped like the arcuate recesses 25 of the front of the inner cylinder chambers. On the peripheral surface of the rotor there is a rotary-reciprocal guide groove 18 around the rotor and its sides has 4 equally spaced waves 24 which are of the same shape as the arcuate recesses of the inner cylinder wall 25 and front rotor's piston 40 wall 24; the peripheral wall and extended inner wall of the rotor's piston 40 has ring grooves 36 and the 4 crest of the waves of the piston 40 has grooves for seals 38 on the peripheral and front surfaces of piston 40 which closes the cylinder chambers 35 from central compression chamber 51 and posterior compression chamber 6 from each other when rings and seals are in place in the engine housing. The piston portion of the rotor 40 has air passage 39 which communicates with the posterior compression chamber 6 and assists in cooling the rotor 2a. The hub 13 fits over the unround portion of the engine shaft 4 and the rotor reciprocates on the engine shaft 4 by means of a roller type bearing or a metal oil bearing. The engine shaft 3 is mounted on bearings 11 on the side walls, front and posterior, and rotates with the rotor 2a. FIG. 9 is a plan view of the engine head for a 4 cycle, 4 cylinder chambers, rotary-reciprocal engine and has a coolant inlet 16 and a coolant outlet 17. It has 2 exhaust ports, 2 intake ports and two spark plugs. The 2 cycle, 2 chambers, rotary-reciprocal engine shown in detail as a double engine in FIG. 7 and 18.

Figure 7:
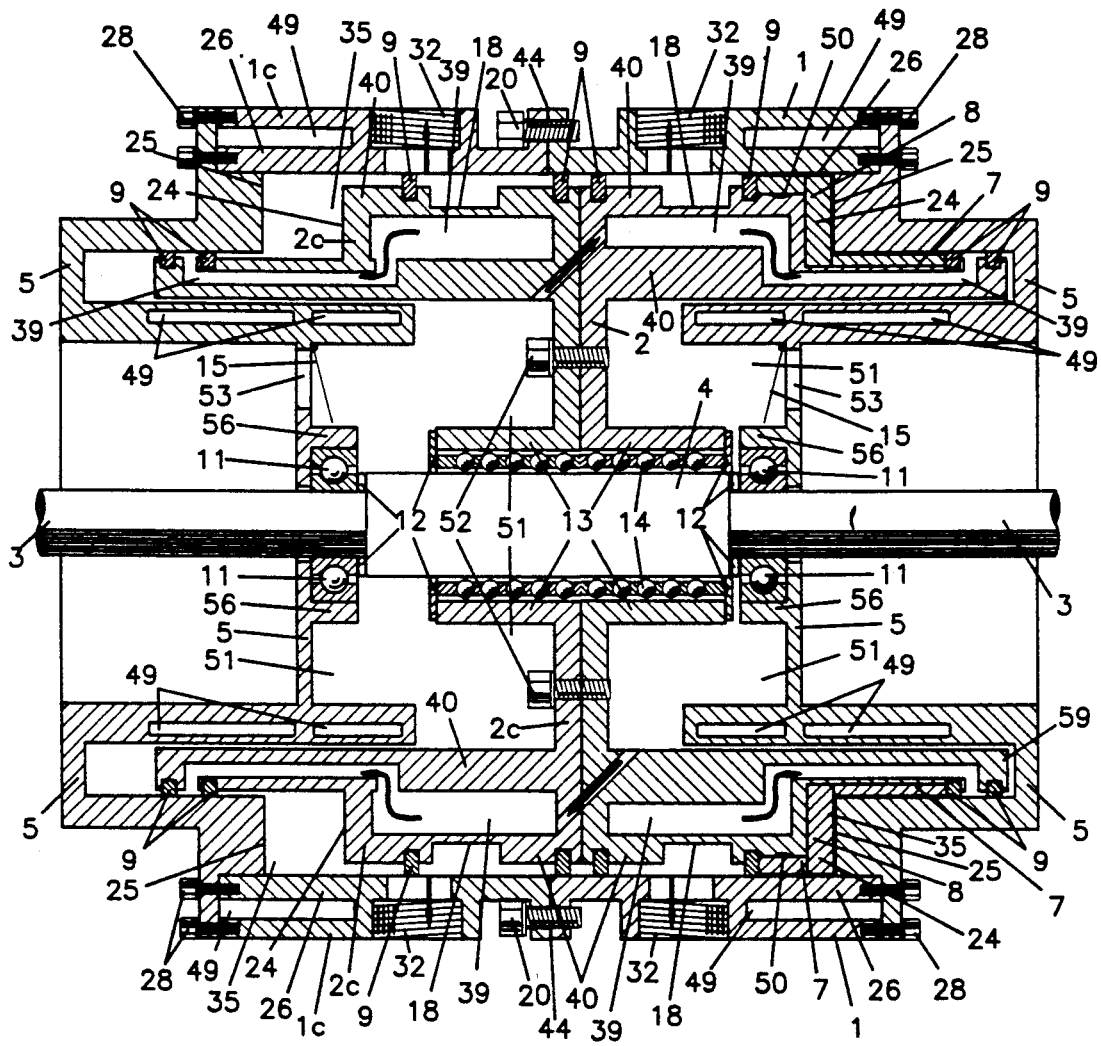
FIG. 7 is a sectional view of a double 2 cycle, 2 cylinder chamber engine.
Figure 15:
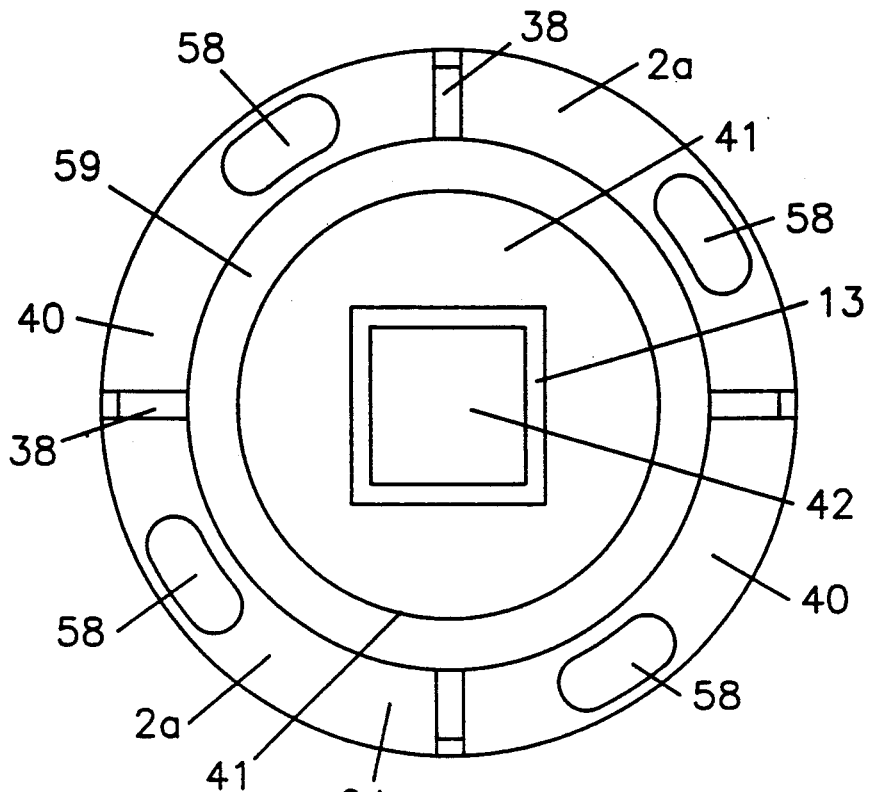
FIG. 15 is a front view of the rotor of a 4 cycle, 4 cylinder chamber engine.
Figures 8, 9:
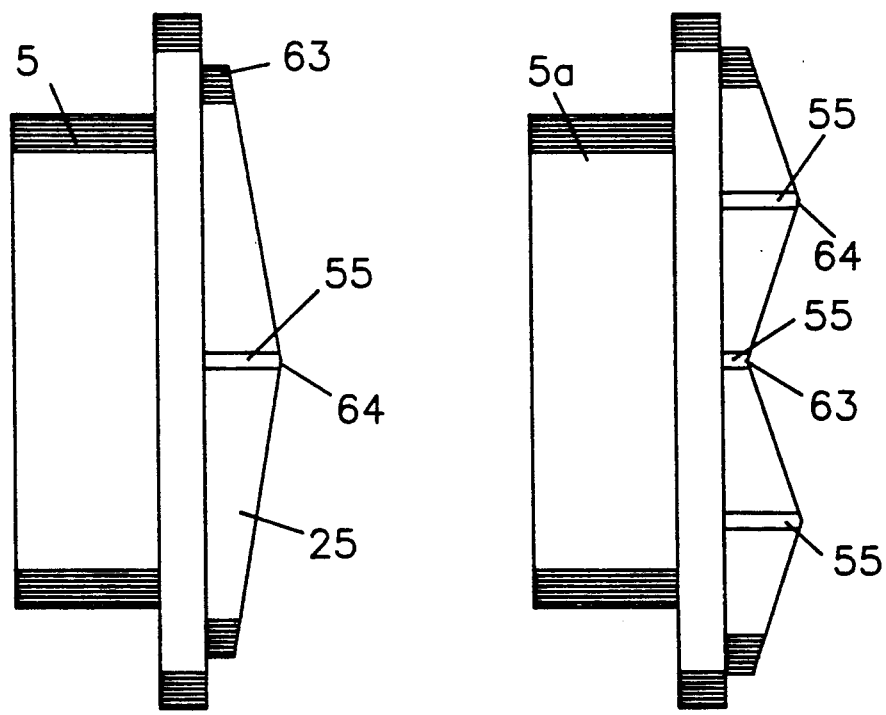
FIG. 8 is a side view of the engine head of a 2 cylinder, 2 cycle engine.
FIG. 9 is a side view of an engine head of a 4 cycle, 4 chamber engine.

FIG. 7 is a sectional view of a double, 2 cycle, 2 cylinder chamber, rotary-reciprocal engine which includes two engine housings 1, 1c which are bolted 20 together posteriorly so that the maximum front arcuate recessed area 64 of the housing 1 is directly opposite to that 64 of other housing 1c, and the fastener of the rotary-reciprocal guides 19 are opposite to each other, the engine heads 5 are bolted 28 to each engine housing 1, 1c, and each has a coolant inlet 16 and a coolant outlet 17; only one engine shaft 3, 4 is utilized and the round area of the engine shaft 3 protrudes out thru the center of both housing's wall. The cylindrical housing cavities contain two rotatable and reciprocable rotors 2, 2c which are attached together posteriorly by bolts 52 and mounted on an engine shaft 4 which rotates with the rotors and has means for the rotors 2, 2c to reciprocate on a bearing 14. The rotors 2, 2c are bolted together so the crest 65 of the front rotor's piston wave of rotor 2 is directly opposite to the trough 66 of the wave of rotor 2c so that the cylinder chamber 35 of housing 1 has its minimum volume and the cylinder chamber 35 of housing 1c has its maximum volume and allow the expanded exhaust gas to exhaust thru the exhaust port 32 of housing 2c and allows passage of a compressed gaseous mixture to pass into the cylinder chamber 35 of housing 2c through passage way 39 from the front central compression chamber 51 of engine housing 1. The rotor's hub 13 has a seal 12 along with the engine shaft bearings 14 to prevent the gaseous mixture from flowing from each central compression chamber. The central compression chamber has a one way air and/or gaseous mixture port 53 into the central compression chambers along with the one way valve 15. The cylinder chamber of engine housing 2 is closed by means of rings 9 and springs 37 behind the rings. The rotors 2, 2c are guided by the rotor-reciprocal guide groove 18 present on each rotor 2, 2c in which the side walls of the guide groove has 2 evenly spaced waves which match the 2 waves 24 of the front of the rotor's piston 40 and the two arcuate recesses 25 of the housing 1, 1c in the front cylinder chamber wall.

FIG. 8 is a side view of a 2 cycle, 2 cylinder engine head (front wall) 5, and includes the seal grooves 55, deep point of depression 64 on the part of the engine head 25 which protrudes into the cylinder chamber 35, shallow point 63 of the depression on the part of the engine head 25 which protrudes into the cylinder chamber 25.

FIG. 9 is a side view of a 4 cycle, 4 cylinder engine's head (front wall) 5a, and includes the seal grooves 55, the deep point of depression 64 on the port of the engine head 25 which protrudes into the cylinder chamber 35, shallow point 63 of the depression on the part of the engine head 25 which protrudes into the cylinder chamber 35.

Figure 10:
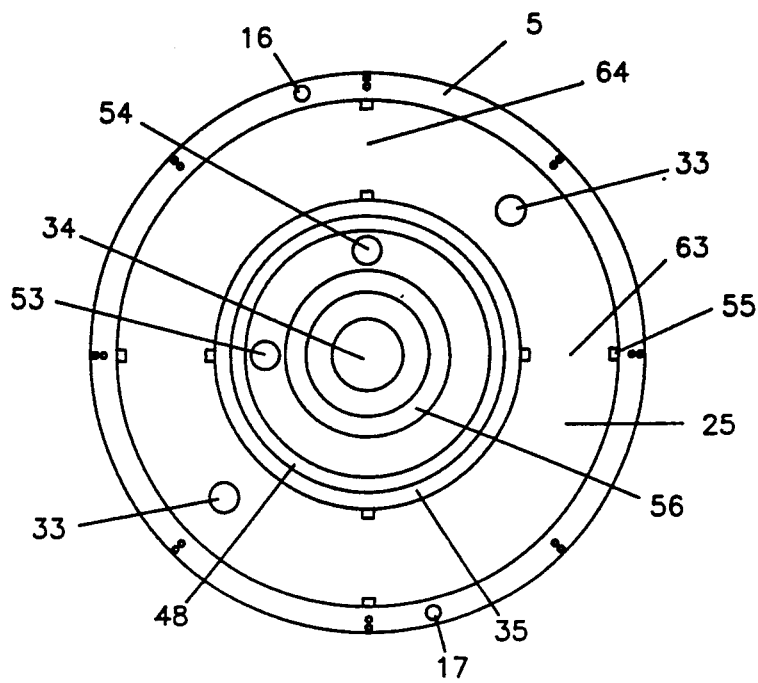
FIG. 10 is a posterior view of the inner surface of the engine head of a 2 cycle, 2 cylinder engine.

FIG. 10 is the inner surface of the engine's head 5 (front wall) for a 2 cycle, 2 cylinder engine and includes the bolt holes for bolt 28, coolant inlet 16, coolant outlet 17, spark plug holes 33, grooves for a seal 55, deep point of depression 64 on the part of the engine head 25 in the cylinder chamber, shallow point 63 of depression on the part of the engine head 25 in the cylinder chamber. There is an inlet to the anterior compression chamber 53 and an outlet from the anterior compression chamber 54. The cylindrical wall 56 holds the bearing for the shaft in place. The central opening 34 is for the round portion of shaft 3. The cylinder chamber 35 extends forward in the engine head to form a chamber for the piston protruding inner wall.

Figure 11:
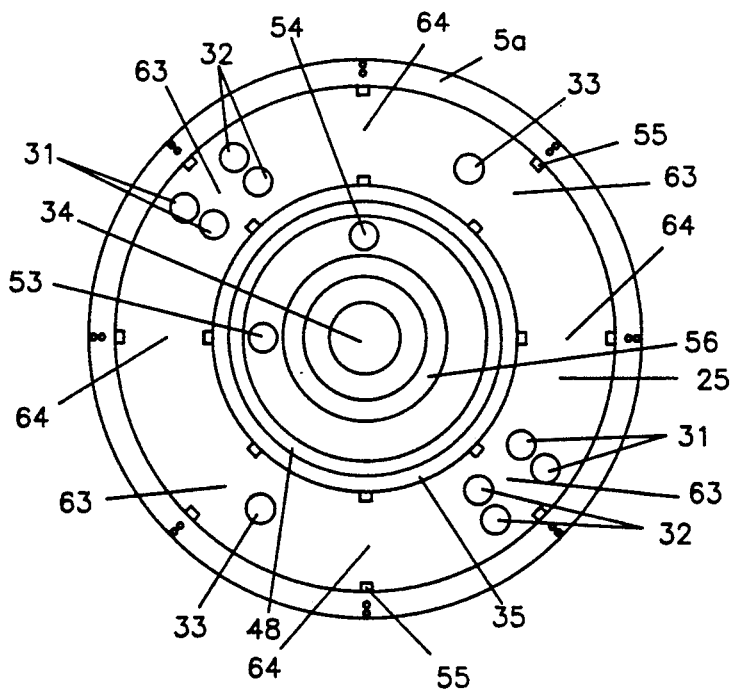
FIG. 11 is a posterior view of a 4 cycle, 4 cylinder chamber, engine head (front side wall of housing).

FIG. 11 is the inner surface of the engine's head 5a of a 4 cycle, 4 cylinder engine and includes the bolt holes for bolt 28, coolant inlet 16, coolant 17, spark plug holes 33, grooves for a seal 55, deep point of depression 64 on the part of the engine head 25 in the cylinder chamber, shallow point 65 of the depression on the part of the engine head 25 in the cylinder chamber. There is an inlet to the anterior chamber 53 and an outlet for the anterior compression chamber 54. The cylindrical wall 56 holds the bearing for the shaft in place. The central opening 34 is for the round portion of shaft 3. The inner cylinderical wall 48 contains the coolant passage way 49. The cylinder chamber 35 extends forward in the engine head to form a chamber for the extended inner circular wall of the piston and the forward portion is sealed off with rings and forms an oil pump 10.

Figure 19:
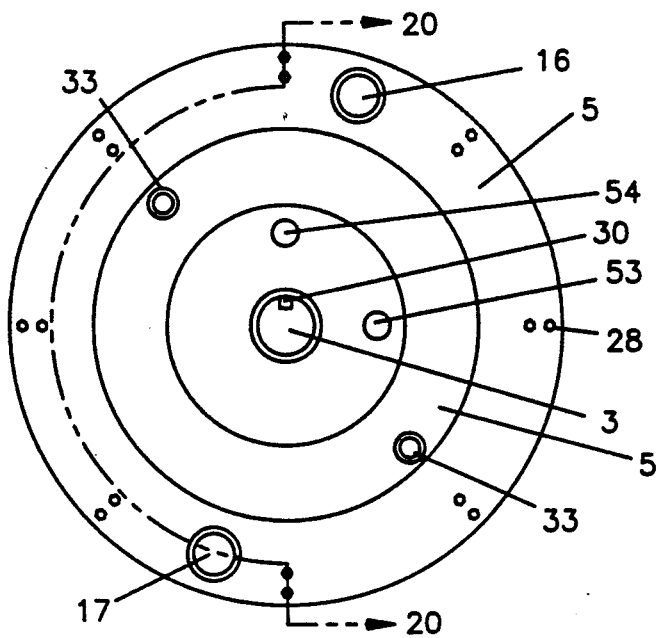
FIG. 19 is a front view of a double 2 cycle, 2 cylinder engine.
Figure 20:
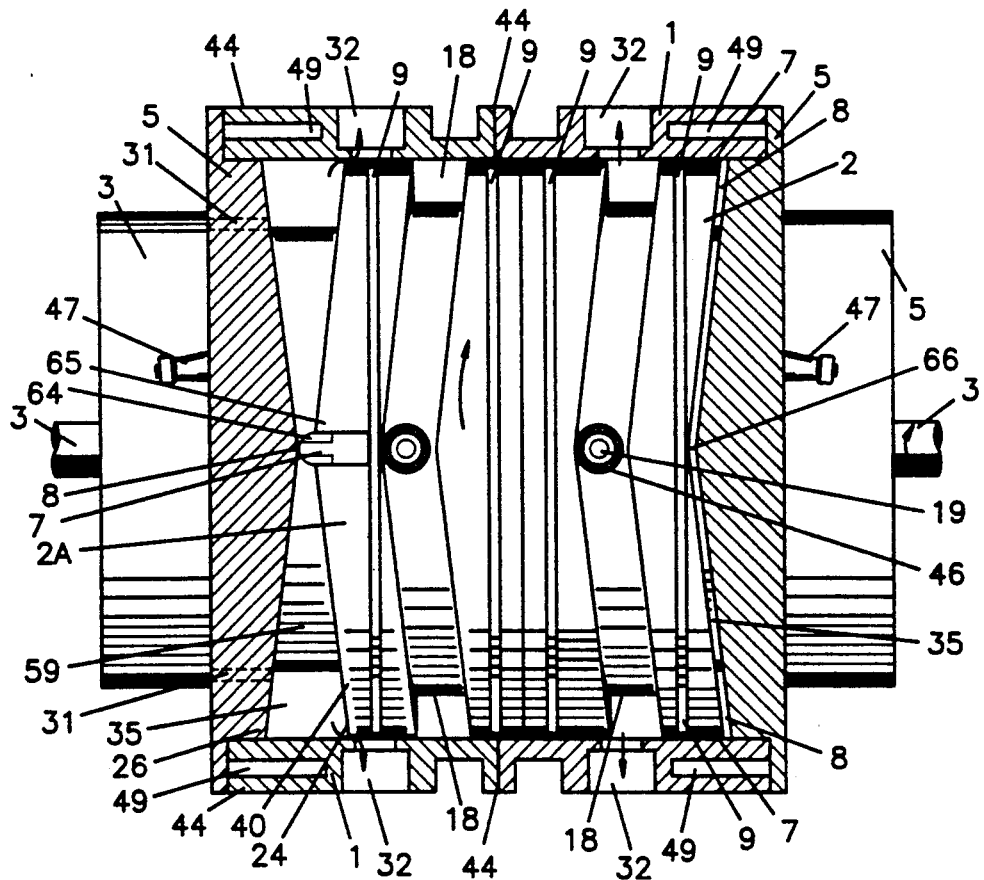
FIG. 20 is a side view of a double 2 cycle, 2 cylinder engine with the side of the housing removed, taken along line 20—20 of FIG. 19.

FIG. 20 is a section of a double 2 cycle, 2 cylinder chambers, rotary-reciprocal engine of FIG. 19 along lines of 20—20 and includes two FIG. 1. engines which are bolted 20 together. The rotors 2,2A are attached together in the housing wherein the trough 66 of the wave 24 on the front of the rotors 2 piston is opposite to the maximum arcuate recessed area 64 of the heads and the seals 8 are located on the crest 65 of the waves of both rotor's piston to form 2 closed cylinder chambers 35 in each engine with minimum volume in the cylinder chambers on one side and maximum volume in the cylinder chambers 35 on the opposite engine, wherein on the opposite engine the crest of the piston's wave 65, on rotor 2A, is opposite to the maximum arcuate recessed area 64 on the opposite engine. The rings 9 on each rotor close off the cylinder chamber from each other. The head 5 has an inlet port 31 which communicate with cylinder chambers and an exhaust port 32 in the peripheral wall of the housing which communicate with the cylinder chambers. As the rotor's seals and rings rotate past the inlet port 31 and the exhaust port 32 both communicate with the same cylinder chamber, the exhaust gases are exhausted and a gaseous mixture flows into the cylinder chamber at the same time. Also at the same time in the opposite cylinders chambers the gaseous mixture is compressed and ready to be ignited. Each cylinder chamber 35 has a spark plug 47 to ignite the compressed gaseous mixture and fires when the gaseous mixture is maximally compressed and the cylinder chamber's 35 volume is starting to expand the rotors reciprocate on the engine shaft 4 and rotates the shaft.

Figure 21:
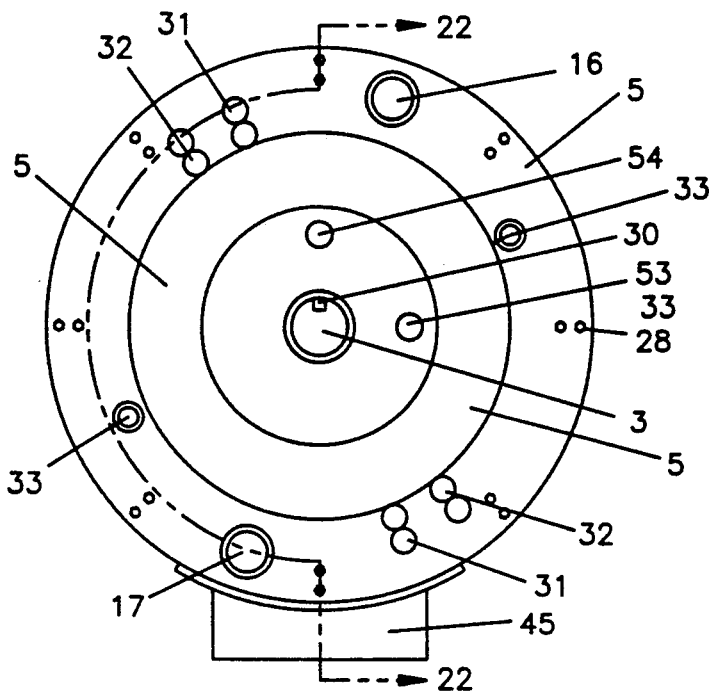
FIG. 21 is a front view of a double 4 cycle, 4 cylinder engine.
Figure 22:
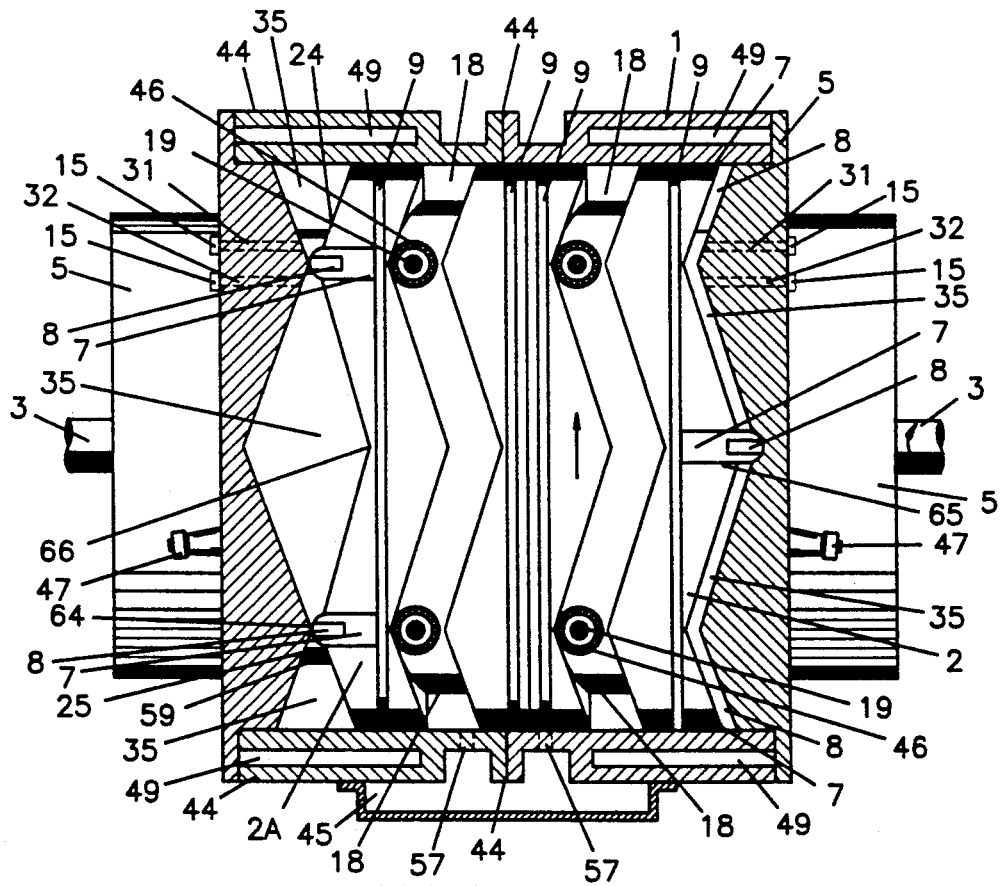
FIG. 22 is a section of side view of a double 4 cycle, 2 cylinder engine with the side of the housing removed, taken along line 22—22 of FIG. 21.

FIG. 22 is a section of a double 4 cycle, 4 cylinder chambers, rotary-reciprocal engine of FIG. 21 along lines 22—22 and includes two FIG. 2 engines which are bolted 20 together. The rotors 2, 2A are attached together wherein the trough 66 of the wave 24 on the front of the rotor's 2 piston 40 is opposite to the maximum arcuate recessed area 64 and the seals 8 are located on the crest 65 of the waves of both rotor's pistons to form 4 closed cylinder chambers 35 with minimum volume whereas the crest of the rotor's 2A piston wave 65 is opposite to the maximum arcuate recessed area 64 to produce maximum volume in these cylinder chambers 35. The rings 9 on each rotor close off the cylinder chambers from each other. The head 5 has an inlet port 31 which communicates with 2 cylinder chamber on each engine and an exhaust port 32 which communicates with 2 cylinder chambers 35 in each engine. The head (front wall) include two spark plugs 47, two exhaust ports 32 and two intake ports 31 for each engine. The double rotor 2,2A is rotatable and reciprocally mounted in the housing on the engine shaft 4. The two rotors 2,2A are bolted together to where the trough of the piston's wave 66 of rotor 2 is directly opposite to the crest of the rotor's 2A piston's wave 65 of rotor 2A. The cylinder chamber 35 is divided into 4 chambers by seals 7, 8 located on the crest of the waves 65 and rings 9. Seals 7, 8 are in contact with the walls of the cylinder chambers. The rotary and reciprocal motions are guided by a bearing 46 which is attached 19 to the housing and follows along a guiding groove 18.

OPERATION

The 2 cycle, 2 cylinder chambers, rotary-reciprocal engines of FIG. 1, 3 and 4 operates with rotor 2 rotating in the clockwise direction and starting from the position of the rotor's 2 piston 40 illustrated in FIG. 4 is in position wherein the waved front portion of the rotor's piston 24 waves are in place between arcuate recesses 25 of the front inner cylinder wall (engine head) and the cylinder chambers 35 space is at its minimum volume, the rotor 2, controlled by means of the stationary rotary-reciprocal guide bearing which is in contact with the waved side wall of the rotary-reciprocal guide groove 18 and has the same shape as the waved front surface of the rotor's piston 24. The rotor's piston 2 encloses together with the contact or runner surface of the engine housing 1 a working or combustion space 35 which increases during further rotation and reciprocation of the rotor 2 in the clockwise direction and, for example, compresses the fuel-air, oil mixture which has been previously vacuumed in from a carburetor into the posterior compression chamber 6 and increases the cylinder chamber 35 space as the rotor 2 reciprocates to the posterior aspect (dead center) of the cylinder chamber 35 and rotates 90° the exhaust port 32 becomes open and the inlet port 31 become open and the compressed fuel-air, oil mixture from the posterior compression chamber 6 fills the cylinder chamber 35, on further clockwise rotation the rotor is guided to reciprocate toward the front of the engine while rotation and decreasing the volume of the cylinder chamber 35 thereby rotating another 90° while compressing the fuel-air, oil mixture to its minimum volume, then at the termination of the forward stroke the mixture is ignited by means of spark plug 47. While the forward stroke is compressing the mixture a new fuel-air, oil mixture is been aspirated from a carburetor into the posterior compression chamber 6. The rotor's piston 40 is being pressed by the combustion gases, with simultaneous guided rotation and reciprocation of the rotor 2 and compression of the gaseous mixture in the posterior compression chamber, until the rotor is reciprocated posteriorly to its maximum reciprocation motion (dead center position) and has rotated 90°, therefore reaching the exhaust port 32 and begin to exit on the peripheral side of the rotor's piston 40 and the inlet port 31 is opened on the central side of the rotor's piston 4 thereby letting the compressed fuel-air, oil mixture fill the cylinder chamber 35 and push the remaining burnt gases out of the cylinder chamber 35. The 2 cycle 4 cylinder chambers, rotary-reciprocal engine rotates 45° with each stroke and has 4 ignitions per rotation of 360°.

A 4 cycle, 2 cylinder chambers, rotary-reciprocal engine operates with rotor rotating in the clockwise direction and starting from the position of the rotor's 2a piston 40 illustrated in FIG. 6 is in position wherein the waved front portion 24 of the rotor's piston is in place between the arcuate recesses 25 of the front inner cylinder wall and the cylinder chamber 35 space is at its minimum volume, the rotor, controlled by means of a stationary rotary-reciprocal guide bearing which is in contact with the waved side wall of the rotary-reciprocal guide groove 18 and has the same wave shape as the waved front surface of the rotor's piston 24 and the same shape as the arcuate recesses 25 of the front inner wall of the cylinder chamber. The rotor's piston 40 encloses together with the contact or runner surface of the engine housing a working or combustion space (cylinder chamber 35) which increases during rotation and reciprocation of the rotor in the clockwise direction and, for example draws in fuel-air mixture for intake port 31. As soon as the rotor's piston 40, after an angular rotation of rotor through 90° and posterior reciprocation of rotor, arrives in the posterior dead center position therefor, the suction stroke is terminated and there commences the compression stroke of the enclosed fuel-air mixture. After a further rotation of the rotor 2d by 90° and reciprocation of the rotor forward to the inner arcuate recesses 25 of the front cylinder chamber wall, the compression stroke of the rotor is terminated and the fuel air mixture compressed thereby is ignited by means of spark plug 47. The rotor's piston 40 is thereby pressed, with simultaneous rotation and posterior reciprocal of the rotor into near posterior dead center position thereof whereupon the rotor opens up the exhaust port 32 so that the burnt gases may be discharged. During the previous described suction stroke which takes place in one cylinder chamber 35 an ignited gaseous mixture expansion takes place in the second chamber then during the previous described compression stroke in one chambers an expelling of the exhaust fumes takes place in the other chamber. There are 2 ignitions of the fuel-air mixture per 360° rotation.

The 4 cycle, 4 chambers, rotary-reciprocal engine of FIG. 2, 5 and 6 has the same suction stroke, compression stroke, expansion stroke and exhaust stroke as described for the 4 cycle, 2 chamber, rotary-reciprocal engine except that two strokes of each are taken place at the same time and there are 4 double ignition per 360° rotation.

The 4 cycle, 3 chambers, rotary-reciprocal engine has an addition chamber where the compressed fuel-air mixture is decompressed then recompressed before ignition takes place in order to heat the fuel-air mixture. The other two chambers function the same as that described above for a 4 cycle, 2 chambers rotary-reciprocal engine and has two ignitions per 360° rotation. The 4 cycle, 6 chambers rotary-reciprocal engine, strokes of suction fill 3 cylinder chambers, strokes of compression compress 3 cylinders chambers, strokes of expansion expand the ignited gas in 3 cylinder chambers and the strokes of exhaustion it exhausts 3 cylinder chambers at the same time. It also has 3 spark plug which ignites the compressed fuel-air mixture in the 3 cylinder chambers at the same time and has 6 triple ignitions per 360° rotation.

Double 2 cycle, 2 cylinder chamber, rotary-reciprocal engine operates the same as the single 2 cycle, 2 chamber, rotary-reciprocal engine described above except that the engine of FIG. 7 doesn't have a posterior compression chamber but the central compression chambers 51 draws in the fuel-air, oil mixture thru the inlet 53 and compresses the fuel-air, oil mixture. The central compression chamber of housing 1 communicates with the cylinder chamber 35 of housing 1c and the central compression chamber 51 of housing 1c communicates with the cylinder chamber of housing 1. The housings 1, 1c and rotors 2, 2c so attached and mounted as in FIG. 7 so that the cylinder chamber 35 volume of housing 1 is at its minimum and the cylinder chamber 35 volume of housing 1c is at its maximum, (at dead center) and allows exhaust gases to flow out exhaust port 32 and the compressed fuel-air mixture to pass into the cylinder chamber 35 of housing 1c from the central compression chamber of housing 1. The step of expansion in the cylinder chamber 35 of housing 1 takes place at the same time as step of compression in the cylinder chamber 35 of housing 1c; then the stroke of expansion of the cylinder chamber of housing 1c takes place at the same time as the stroke of compression of the cylinder chamber of housing 1 when rotor 2 and 2c are rotating clockwise. The strokes of intake and exhaustion are done at the same time when the rotors 2 or 2c are at dead center (maximum posterior reciprocation). The ignition of the compressed fuel-air, oil mixture in the cylinder chamber 35 of housing 1 takes place by means of a spark plug 47 and the rotor's piston 40 is thereby pressed and simultaneous reciprocation and rotation of the rotors 2, 2c for 90° and rotor 2 goes to dead center and rotor 2c compresses the fuel-air, oil mixture in the cylinder chamber of housing 1c. The expanded burnt gases is exhausted from the cylinder chamber 35 of housing 1 and the compressed fuel-air mixture from central compression chamber of housing 1c flows into the cylinder chamber of housing 1 then the compressed fuel-air, oil mixture in cylinder chamber 35 of housing 1c is ignited by means of a spark plug 47 and the rotor's piston 40 is thereby pressed, with simultaneous reciprocation and rotation of the rotor 2c by 90° to dead center at the same time compressing the fuel-air, oil mixture in the cylinder chamber of housing 1. The expanded exhaust gas passes out thru the exhaust port 32 and the compressed fuel oil mixture from the central compression chamber of housing 1 flows into the cylinder chamber 35 of housing 1c. There are two ignition per engine (total of 4) per 360° rotation.

Double 4 cycle, 2 or more cylinder chambers, rotary-reciprocal engine operates the same as the single 4 cycle 2 or 4 cycle, 4 cylinder of FIG. 5 and 6 or more cylinder chambers, rotary-reciprocal engine described above except that the double engine does not have posterior compression chambers. The housings of a double 4 cycle, 4 cylinder engine containing two 4 cycle, 4 cylinder as of FIG. 5 and 6 and rotor so attached and mounted as in FIG. 7 so that the cylinder chamber's volume of both housing and both rotors so attached and mounted as in FIG. 7 so that the cylinder chamber's volume of one housing is at its minimum volume and the cylinder chamber's volume of opposite housing is at its maximum volume (at dead center or maximum posterior reciprocation). The stroke of expansion in one housing 1a takes place at the same time as the stroke of compression takes place in opposite housing in one cylinder chamber 35 when rotor rotates clockwise and in the other cylinder chamber of housing the stroke of suction takes place and in the other cylinder chamber of opposite housing the stroke of exhaustion takes place at the same time. The ignition of compressed fuel-air mixture in the cylinder chamber 35 housing takes place by means of a spark plug 47 and the rotor's piston 40 is thereby pressed and simultaneous reciprocation and clockwise rotation of rotor for 90° and rotor goes from dead center and compresses aspirate fuel-air mixture while at the same time in the other cylinder chamber of opposite housing a fuel-air mixture is aspirated thru inlet port 31 and in the other cylinder chamber 35 of housing expanded exhaust gases are exhausted thru the exhaust port 32. There are two ignitions for each motor (total of 4) per 320° of engine shaft rotation when two cylinder chambers are present on each side.

Double 4 cycle, 4 cylinder chambers, rotary-reciprocal engine operates the same as the 4 cycle, 2 cylinder chambers, rotary-reciprocal engine described above except that there are two cylinders chambers for the strokes of aspiration and compression and two cylinders chambers for the strokes of expansion and exhaustion in each engine so that there are two spark plugs 47 igniting at the same time on each engine and the spark plugs are located opposite each other to balance the force applied to the rotors. The engine's two spark plugs 47 in one engine fire every time the rotor rotates clockwise 45° and then the other engine fires it two spark plug 47 and the rotors rotate 45°. There are 4 ignitions for each engine or a total of 8 ignitions per 360° rotation of the rotors.

Double 4 cycle, 6 cylinder chambers, rotary-reciprocal engine consisting of two engines operates the same as the double 4 cycle 2 cylinder chamber, rotary-reciprocal engines described above except that each engine would have 3 cylinder chambers 35 for the strokes of aspiration and compression and 3 cylinder chambers 35 for the strokes of expansion and exhaustion in each engine so that there are three spark plugs 47 igniting at the same time on each engine. There are 6 ignitions for each engine or a total of 12 ignitions per 360° rotation of the rotors.

It will be understood that various changes and modifications may be made in the constructions described which provide the characteristics of this invention without departing from the spirit thereof particularly as defined in the following Claims.

I claim:

1. An internal combustion engine of the rotary-reciprocal type comprising, a housing formed with a peripheral wall with side walls which contains a cylindrical inner wall attached to one of said side wall at 90°, inner surface of said peripheral wall being cylindrical, a rotor having a peripheral circular piston having equally spaced wave-shaped side wall with inner circular piston wall projection in front and below the piston waves, rotatably and reciprocal mounted in said housing, a shaft for said rotor, extending through said side walls and the rotor to reciprocate on shaft and shaft rotates with rotor, said housing having a lateral and peripheral circular cylinder chamber having equally spaced arcuate recesses extending into said cylinder chamber's side wall and below the said arcuate recesses the peripheral wall and the inner cylindrical wall protrude out in front to form a chamber, the number and shape of recesses being equal to the number and shape of waves on the piston's side wall and the number being 2 or more, piston's waves movably mounted in each of said arcuate recesses respectively, the rotor's piston's peripheral and inner circular surface remaining in sealing contact with the inner peripheral wall, the peripheral surface of the circular inner wall at all times and any seal on the crest of waves of the piston remaining in sealing contact with the inner wall's peripheral surface, peripheral housing wall's inner surface and arcuate recesses of said side wall and forming variable volume cylinder chambers between the rotor's piston's waved side wall and said cylinder chamber walls, said housing being provided with means admitting a gaseous mixture communicating with said cylinder chambers, means discharging combustion products communicating with a said cylinder chambers and ignition means communicating with said cylinder chambers, means to guide rotor's rotary and reciprocal motions in said housing, said cylinder chambers of varying sizes enabling a compression of a gaseous mixture to take place after suction, ignition of said compressed gaseous mixture and expansion of said chambers due to the pressure of said combustion products.

2. The engine according to claim 1, wherein the peripheral wall of said housing is provided with exhaust ports extending therethrough and the cylindrical inner wall of said housing is provided with intake ports extending therethrough, said ports being adapted to be opened or closed by said rotor during rotation and reciprocation and constituting said means for admission of combustion mixture and means for discharging the combustion products.

3. The engine according to claim 1, wherein the arcuated recessed side wall of said housing is provided with exhaust ports extending therethrough and is provided with intake ports extending therethrough, said ports being adapted to be opened or closed by said rotor during rotation and reciprocation and constituting said means for admission of combustion mixture and means for discharging the combustion products.

4. The engine according to claim 1 wherein a bearing is attached to the inner surface of the said peripheral housing wall and rotates in a groove on peripheral wall of said rotor, said groove housing waved side walls which are of the same shape and number as the waves on the side wall of the rotor's piston and constituting said means for guiding the rotor's rotation and reciprocation.

5. The engine according to claim 1 wherein 1 or 2 compression chambers are formed between the rotor and housings side walls and provided with a one way inlet for a gas or a gaseous mixture to flow into the compression chamber then compressed and has means to deliver the gas or a gaseous mixture to the said intake port.

6. The engine according to claim 1 wherein the engine is cooled by a liquid cooling system.

7. The engine according to claim 1 wherein the engine is cooled by air flowing over cooling fins.

8. A rotary-reciprocal combustion engine having a cycle of two strokes, compression and expansion wherein exhaust and intake takes place at the end of the expansion stroke; said engine comprising:

a) a housing formed with a peripheral wall with side walls, a rotor in said housing, the inner surface of said peripheral inner wall being cylindrical, said housing having a laterally and peripherally spaced cylinder chamber formed with walls consisting of the inner cylindrical surface of the peripheral housing wall, a peripheral area of one side wall and an inner circular wall attached to said front side wall of the housing and extending parallel with the peripheral wall toward the center of the housing thereby leaving space in the middle of the housing for the rotor to rotate and reciprocate, said one side wall having equally spaced arcuate recesses projecting into the cylinder chambers, said housing having an anterior central compression chamber and a posterior compression chamber separated by the rotor and being provided with means for admitting a gaseous mixture communicating with said cylinder chambers, means for discharging combustion products communicating with said cylinder chambers, said posterior and anterior central compression chambers having means for admitting and discharging a gaseous mixture;

b) said rotor formed with a thick peripheral wall and one side wall at 90° to the peripheral wall, said peripheral wall is cylindrical, said thick peripheral wall is the rotor's piston, having equally spaced waves on the said side wall of the rotor's piston, said waves being of equal number and shape as said arcuate recesses, wherein the number of waves and arcuate recesses is greater than two, the rotor's piston having means to divide the housing's cylinder chamber into two or more seated cylinder chambers, the inner circular wall of said rotor's piston extends outward below the said piston waves, said rotor's side wall having a centrally located hub which extends at 90° to the rotor's side wall and the hub has an opening in the center of the hub for an engine shaft, the rotor's piston having means to divide the housing's cylinder chambers into 2 or more seated cylinder chambers, rotor is rotatably and reciprocally mounted in said housing with the rotor's piston waves movably mounted in each of said arcuate recesses respectively remaining in sealing contact with said cylinder chamber walls;

c) a shaft; mounted in the center of the housing, passing through the rotor's hub and extending through the side walls of the housing, said hub having means to allow the rotor to reciprocate on the shaft while the shaft is rotating with the rotor;

d) a reciprocal and rotary guide having means to guide the rotor's rotary and reciprocal motions while keeping the rotor's pistons in continuous sealing contact with said cylinder chambers walls and varying the volume of the cylinder chambers enabling a compression of a gaseous mixture to take place after aspirating a gaseous mixture;

e) an ignition system having means for igniting compressed gaseous mixture and expansion of said cylinder chambers due to pressure of said combustion products.

9. The engine of claim 8 wherein the combustion fuel is injected directly into the cylinder chamber containing compressed air at the end of the compression stroke and before ignition by means of an air-assisted direct injection system.

10. The engine according to claim 6 wherein the rotor has means for admitting compressed air from the posterior compression chamber to the cylinder chambers and wherein the combustible fuel is injected directly into the cylinder chambers containing compressed air after the compression stroke and before ignition by means of a direct injection system.

11. The engine according to claim 8 wherein the engine has 4 or more sealed cylinder chambers and the intake ports, exhaust ports and ignition system communicates with one half of the cylinder chamber.

12. A rotary-reciprocal combustion engine having a cycle which includes the four strokes of intake, compression, expansion and exhaustion, said engine comprising:

a) a housing formed with a peripheral wall with side walls, said peripheral inner wall being cylindrical, having a laterally and peripherally spaced cylinder chambers formed with walls consisting of the inner circular surface of the peripheral housing wall, a peripheral area of one side wall and an inner circular wall attached to said one side wall of the housing and extending parallel with the peripheral wall of the housing toward the center of the housing cavity thereby leaving space in the housing for the rotor to rotate and reciprocate, said side wall having equally spaced arcuate recesses projecting into the cylinder chambers and two circular walls projecting outward which forms a chamber for the inner circular wall of piston which protrudes out, said housing having an anterior central compression chamber and a posterior compression chamber separated by the rotor and being provided with means for admitting a gaseous mixture communicating with said cylinder chamber, means for discharging combustion products communicating with said cylinder chamber, posterior and central anterior chambers having means for admitting and discharging a gaseous mixture;

b) a rotor formed with a thick peripheral wall with one side wall at 90° to peripheral wall and one side is hollow, said peripheral wall is cylindrical, said thick peripheral wall is the rotor's piston having equally spaced waves on the side of the hollow peripheral wall at 90° to the peripheral wall, said waves being of equal number and shape as said arcuate recesses, said rotors inner circular wall protrudes forward, said rotor's side wall having a centrally located hub which extends at 90° to the rotor's side wall into the hollow area of the rotor and the hub has an opening for an engine shaft, the rotor's piston having means to divide the housing cylinder chamber into 2 or more cylinder chambers, rotor is rotatably and reciprocally mounted in said housing with the rotor's piston waves movably mounted in each of said arcuate recesses respectively remaining in sealing contact with said cylinder chamber walls;

c) a shaft; mounted in the center of housing cavity, passing through the rotor's hub and extending through the side walls of the housing, having means to allow the rotor to reciprocate on the shaft while the shaft is rotating with the rotor;

d) a reciprocal and rotary guide having means to guide the rotor's rotary and reciprocal motions of the rotor while keeping the rotor's piston in continuous sealing contact with said cylinder chamber walls and varying the volume of the cylinder chambers enabling a compression of a gaseous mixture to take place after aspirating, a gaseous mixture;

e) ignition system having means for igniting compressed gaseous mixture and expansion of said cylinder chambers due to pressure of said combustion products.

13. The engine according to claim 9 wherein the combustible fuel is injected directly into the cylinder chambers containing compressed air after the compression stroke and before the ignition by means of a direct injection system.

14. The engine according to claim 9 wherein the engine has 4 or more sealed cylinder chambers and the intake ports, exhaust ports and ignition system communicates with one half of the cylinder chambers.

15. The engine according to claim 9 wherein the anterior and posterior central compression chambers are utilized as a pump.

16. A double internal combustion engine of the rotary-reciprocal type comprising, a housing formed with a peripheral wall and extends below and in front of the cylinder chambers with side walls which contains bilateral circular inner walls on each wall at 90° to side walls, inner surface of said peripheral wall being cylindrical and extends below and in front of the cylinder chambers, a rotor having two laterally and peripherally located pistons, each having equally placed wave-shaped sidewall, the inner cylindrical piston's wall extends in front of the waved side wall and said rotor is reciprocally and rotatably mounted in said housing, a shaft for said rotor extending through said side walls and having means for the rotor to reciprocate on the shaft while shaft rotates with rotor, said housing having bilateral and peripheral circular cylinder chambers having equally spaced arcuate recesses extending into cylinder chamber's side walls. The circular front peripheral walls are smaller in circumference and the inner circular walls protrude outward. Together they form a chamber, the number and shape of recesses being to the number and shape of the waves on the pistons and the number being 2 or more on each side wall, having the crest of the wave of one piston being directly opposite to the trough of the wave of the other piston, one piston's waves is movably mounted in each of said arcuate recesses respectively with piston's peripheral wall inner peripheral wall and crest of the waves surfaces remaining in sealing contact with cylinder chambers walls, the other piston is movably mounted wherein the crest of the waves of this piston is directly opposite to the maximum area of recess on the arcuate recesses of the other cylinder chamber wall with piston's peripheral wall, inner peripheral wall and crest of the waves surfaces remaining in sealing contact with cylinder chambers walls, said housing being provided with means admitting a gaseous mixture communicating with one half of sealed said cylinder chambers on each side, means discharging combustion products communicating with one half of sealed said cylinder chambers on each side, and ignition means communicating with one half of sealed said cylinder chambers on each side, means to guide rotor's rotary and reciprocal motions in said housing, said cylinder chambers of varying sizes enabling a compression of a gaseous mixture to take place after suction, ignition of said compressed gaseous mixture and expansion of said chambers due to the pressure of said combustion products.

17. The double engine of claim 16 wherein the peripheral wall of said housing provided with exhaust ports for the bilateral cylinder chambers extending therethrough and the bilateral circular inner walls of said housing is provided with intake ports extending therethrough, said ports being adapted to be opened or closed by said rotor during rotation and reciprocation and constituting said means for admission of combustion mixture and means for discharging the combustion products.

18. The double engine according to claim 16, wherein the arcuate recessed side walls of said housing is provided with exhaust ports extending therethrough and is provided with intake ports extending therethrough, said ports being adapted to be opened or closed by said rotor during rotation and reciprocation and constituting said means for admission of combustion mixture and means for discharging the combustion products.

19. The double engine according to claim 16, wherein a bearing is attached to the inner surface of the said peripheral housing wall and rotates in a groove on the peripheral wall of said rotor, said groove having waved side walls which are the same shape and number as the waves on the side wall of the rotor's piston and constituting said means for guiding the rotors rotation and reciprocation.

20. The double engine according to claim 16 wherein the combustible fuel is injected directly into the cylinder chamber containing compressed air after the compression stroke and before ignition by means of a direct injection system.

21. The double engine of claim 16 wherein two of these engines shaft are attached together thereby forming a quadruple engine.

22. A double rotary-reciprocal combustion engine having a cycle of two strokes, compression and expansion wherein exhaust and intake takes place at the end of the expansion stroke; said engine comprising:
a) a housing formed with a peripheral wall with side walls, the inner surface of said peripheral wall being cylindrical, having bilaterally and peripherally spaced cylinder chambers wherein each are formed with walls consisting of the inner circular surface of the peripheral housing wall, a peripheral area of one side wall and one of the bilateral inner circular walls each attached to different side walls of the housing and both extending parallel with the peripheral wall toward the center of the housing cavity thereby leaving space in the middle of the housing for the rotor to rotate and reciprocate and extend outward with a peripheral wall to form a chamber for the inner protruding walls of the pistons, both said side walls having equally spaced arcuate recesses projecting into the cylinder chamber with the maximum recessed area of the arcuate recesses on one side wall of the housing being directly opposite to the maximum recessed area of the arcuate recesses on the other side wall of the housing, being provided with two anterior central chambers which are separated by the rotor, being provided with means for admitting a gaseous mixture into the anterior cylinder chambers, means for communicating each anterior central compression chamber with the opposite cylinder chamber, means for discharging combustion products communicating with each cylinder chamber;
b) a rotor formed with a thick peripheral wall and one center wall at 90° to the peripheral wall, said peripheral wall is cylindrical and hollow on each side of the center wall, said thick peripheral wall are the rotor's piston, one on each side of the center wall, the rotor pistons having equally spaced waves on both ends of the thick peripheral wall at 90° to the peripheral wall, said waves being of equal number and shape as said arcuate recesses, having the crest of the wave on one piston being directly opposite to the trough of the wave on the other piston, said rotor inner circular wall protrudes outward, said rotors center wall having a centrally located hub which extends at 90° bilaterally from the center wall and the hub has an opening for an engine shaft, the rotor's piston having means to divide the housing's cylinder chambers into 2 or more closed cylinder chambers, rotor is rotatably and reciprocally mounted in said housing cavity with one of the rotor's piston's waves movably mounted in each of said arcuate recesses respectively remaining in sealing contact with said cylinder chamber walls on one side of the rotor and on the other side of the rotor the crest of the piston's waves are directly opposite to the most recessed area of the other arcuate recesses respectively remaining in sealing contact with said cylinder chamber walls;
c) a shaft, mounted in the center of housing cavity, passing through the rotor's hub and extending through the side walls of the housing, having means to allow the rotor to reciprocate on the shaft while the shaft is rotating with the rotor;
d) a reciprocal and rotary guide having means to guide the rotor's rotary and reciprocal motions while keeping the rotor's pistons in continuous sealing contact with said cylinder chambers walls and varying the volume of the cylinder chambers enabling a compression of a gaseous mixture to take place after aspirating a gaseous mixture;
e) ignition system having means for igniting compressed gaseous mixture and expansion of said cylinder chambers due to pressure of said combustion products.

23. The engine according to claim 22 wherein compressed air from the central compression chamber is injected into the intake port at the end of the expansion stroke and an air-assisted gaseous mixture is injected directly into the cylinder chambers after the exhaust ports are closed.

24. A double rotary-reciprocal combustion engine having a cycle which includes the four strokes of intake, compression, expansion and exhaust; said engine comprising:
a) a housing formed with a peripheral wall with side walls, the inner surface of said peripheral wall being cylindrical, having bilateral and peripherally spaced cylinder chambers wherein each are formed with walls consisting of the inner circular surface of the peripheral housing wall, a peripheral area of one side wall and one of the bilateral inner circular walls with each inner circular wall being attached to different side walls of the housing and both extending parallel with the peripheral wall toward the center of the housing cavity thereby leaving space in the middle of the housing for the rotor to rotate and reciprocate, both peripheral walls and both inner peripheral extending outward to form circular chambers below the arcuate recesses, both said side walls having equally spaced arcuate recesses projecting into the cylinder chambers with the maximum recessed area of the arcuate recesses on one side wall being directly opposite to the maximum recessed area on the other side wall, being provided with two anterior central compression chambers which are separated by the rotor, being provided with means for admitting a gas or a liquid into the anterior central compression chambers, means for discharging a gas or a liquid from the anterior central compression chambers;

b) a rotor formed with a thick peripheral wall and one center wall at 90° to the peripheral wall, said peripheral wall is cylindrical and hollow on each side of the center wall, said thick peripheral wall are the rotor's pistons, one on each side of the center wall, rotor pistons having equally spaced waves on both ends of the thick peripheral wall at 90° to the peripheral wall, said waves being of equal number and shape as said arcuate recesses, wherein the number is greater than 2 on each side of the rotor, having the crest of the wave on one piston being directly opposite to the trough of the wave on the other piston, said piston's inner circular wall extends out past the waves on the piston, said rotor's center wall having a centrally located hub which extends at 90° bilaterally from the center wall and hub having an opening for an engine shaft, the rotor's piston having means to divide the housing's cylinder chambers into 2 or more sealed cylinder chambers on each side of housing, rotor is rotatably and reciprocally mounted in said housing cavity with the rotor's piston waves movably mounted in each of said arcuate recesses respectively in sealing contact with said cylinder chamber walls on one side of the rotor and on the other side of the rotor the crest of the piston's waves are directly opposite to the most recessed area of the arcuate recesses respectively remaining in sealing contact with said cylinder chamber walls;

c) a shaft, mounted in the center of housing cavity, passing through the rotor's hub and extending through the side walls of the housing, having means to allow the rotor to reciprocate on the shaft while the shaft is rotating with the rotor;

d) a reciprocal and rotary guide having means to guide the rotor's rotary and reciprocal motions while keeping the rotor's pistons in continuous sealing contact with said cylinder chambers walls and varying the volume of the cylinder chambers enabling a compression of a gaseous mixture to take place in one half or less of the sealed cylinder chambers after aspirating a gaseous mixture into these sealed cylinder chambers on one side of the housing;

e) ignition system having means for igniting compressed gaseous mixture in one half or less of the sealed cylinder chambers and expansion of said cylinder chambers due to pressure of said combustion products.

* * * * *